United States Patent
Yamada et al.

(10) Patent No.: US 10,279,755 B2
(45) Date of Patent: May 7, 2019

(54) WIRE HARNESS ARRANGEMENT STRUCTURE OF VEHICLE

(71) Applicant: MAZDA MOTOR CORPORATION, Hiroshima (JP)

(72) Inventors: Sadahisa Yamada, Hiroshima (JP); Taro Tamagawa, Kure (JP); Masaaki Shimizu, Iwakuni (JP); Osamu Michihira, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/656,553

(22) Filed: Jul. 21, 2017

(65) Prior Publication Data
US 2018/0029542 A1    Feb. 1, 2018

(30) Foreign Application Priority Data

Jul. 29, 2016  (JP) ................................ 2016-150015

(51) Int. Cl.
*B60R 16/02*  (2006.01)
*B60R 16/023*  (2006.01)
*B60R 16/03*  (2006.01)

(52) U.S. Cl.
CPC ...... *B60R 16/0207* (2013.01); *B60R 16/0231* (2013.01); *B60R 16/03* (2013.01)

(58) Field of Classification Search
CPC ................................................. B60R 16/0207
USPC ....................................................... 174/72 A
See application file for complete search history.

(56) References Cited

U.S. PATENT DOCUMENTS

| | | | |
|---|---|---|---|
| 6,883,628 B1* | 4/2005 | Mizukami | ........... B60R 16/0315 180/291 |
| 2004/0047336 A1* | 3/2004 | Shabtay | ................ H04L 12/437 370/351 |
| 2004/0135400 A1* | 7/2004 | Matsuzaki | ........ B29C 45/14598 296/193.02 |
| 2004/0227402 A1* | 11/2004 | Fehr | .................... B60R 16/0315 307/10.1 |
| 2006/0250947 A1* | 11/2006 | Allen | ................ H04L 12/40182 370/216 |
| 2012/0160578 A1* | 6/2012 | Tamagawa | .......... B60R 16/0207 180/54.1 |

FOREIGN PATENT DOCUMENTS

| | | |
|---|---|---|
| JP | H06-112939 A | 4/1994 |
| JP | 2006-051922 A | 2/2006 |
| JP | 2014-034373 A | 2/2014 |

* cited by examiner

*Primary Examiner* — Stanley Tso
(74) *Attorney, Agent, or Firm* — Studebaker & Brackett PC

(57) ABSTRACT

The present invention relates to a wire harness arrangement structure of a vehicle, comprising plural component control parts to control plural electric components for governing a drive of the vehicle, a main control part to generate a command signal for providing a command to the plural component control parts, and plural main wire harnesses to transmit the command signal. The plural electric components include at least a brake, an engine, a transmission, and a steering, and the plural main wire harnesses constitute a signal transmission loop which extends from the main control part and returns to the main control part by way of the plural component control parts.

5 Claims, 15 Drawing Sheets

WIRE HARNESS ARRANGEMENT STRUCTURE OF VEHICLE

BACKGROUND OF THE INVENTION

The present invention relates to a signal transmission technology of a vehicle.

Various vehicle driving technologies have been developed recently. For example, one of many onboard CPUs (Central Processing Units) which are installed to the vehicle is used as a main control part to control other CPUs totally. This main control part may be configured to determine various target values of a vehicle speed, a vehicle acceleration, a vehicle traveling direction, a braking force to be applied to the vehicle, or a traction to be transmitted to a road surface from the vehicle based on information provided from various onboard sensors or cameras. These target values determined by the main control part are transmitted to the other CPUs through wire harnesses (see Japanese Patent Laid-Open Publication No. 2014-34373).

The other CPUs are used as component control parts to control corresponding electric components (an engine, a transmission, a brake, or a steering, for example). The component control parts which receive the target values from the main control part control the corresponding electric components so that the target values of the speed, the acceleration, the traveling direction, the braking force, or the traction can be achieved.

According to the technology disclosed by the above-described patent document, the signal transmission from the main control part to the component control parts relies on a single signal transmission route. If the vehicle contacts an obstacle softly (another vehicle, for example) and the signal transmission route is shut down (damaged), the information transmission from the main control part to the component control parts may be stopped. In a case where the component control parts control the electric components for governing a drive of the vehicle, such as the engine, the transmission, the brake, or the steering, the above-described information-transmission stop may cause the loss of controls of basic motions of the vehicle, such as "vehicle advancing," "vehicle retreating," "vehicle traveling-direction changing," or "vehicle stopping."

SUMMARY OF THE INVENTION

An object of the present invention is to provide a wire harness arrangement structure of a vehicle which can transmit the information provided from the main control part to the plural component control parts to govern the drive of the vehicle, such as the engine, the transmission, the brake, or the steering, with high reliability.

The present invention is a wire harness arrangement structure of a vehicle, comprising plural component control parts to control plural electric components for governing a drive of the vehicle, a main control part to generate a command signal for providing a command to the plural component control parts, and plural main wire harnesses to transmit the command signal, wherein the plural electric components include at least a brake, an engine, a transmission, and a steering, and the plural main wire harnesses constitute a signal transmission loop which extends from the main control part and returns to the main control part by way of the plural component control parts.

According to the present invention, since the plural main wire harnesses constitute the signal transmission loop which extends from the main control part and returns to the main control part by way of the plural component control parts to control the plural electric components, such as the brake, the engine, the transmission, and the steering, the command signal transmission from the main control part to the plural component control parts can be maintained even if the signal transmission loop is shut down (broken). Accordingly, the basic motions of the vehicle, such as "proceeding," "retreating," "curving," or "stopping," can be maintained properly even after the signal transmission loop has been shut down.

In the above-described wire harness arrangement structure, only the plural component control parts to control the brake, the engine, the transmission, and the steering may be electrically connected to the signal transmission loop. According to this structure, a gross weight of the wire harness arranged in the vehicle does not increase unnecessarily. Additionally, the wire harness arrangement structure of the vehicle does not become complex unnecessarily.

In the above-described wire harness arrangement structure, this structure may further comprise a sub control part to control another onboard component than the brake, the engine, the transmission, and the steering, and a sub wire harness to constitute a signal transmission line between the above-described sub control part and the main control part. According to this structure, since the sub control part to control the other onboard component than the brake, the engine, the transmission, and the steering is connected to the main control part through the sub wire harness constituting the signal transmission line, the gross weight of the wire harness arranged in the vehicle does not increase unnecessarily. Additionally, the wire harness arrangement structure of the vehicle does not become complex unnecessarily.

In the above-described wire harness arrangement structure, the plural component control parts may be provided between a front end of the vehicle and a dash panel of the vehicle, and the main control part may be provided in back of the dash panel. According to this structure, since the plural component control parts are provided between the front end of the vehicle and the dash panel of the vehicle, the signal routes for signal transmission from the plural component control parts to the plural electric components, such as the brake, the engine, the transmission, or the steering are properly shortened. Further, since the main control part is provided in back of the dash panel, the performance of the main control part is properly maintained even if the vehicle collides with an obstacle.

In the above-described wire harness arrangement structure, the signal transmission loop may include a first route which extends in a first direction which is directed toward the front end of the vehicle from the dash panel and a second route which is spaced apart from the first route in a second direction perpendicular to the first direction and extends in the first direction, and at least part of the plural electric components may be provided between the first route and the second route. According to this structure, since the second route is spaced apart from the first route in the second direction such that at least part of the plural electric components is (are) arranged between the first route and the second route, either one of the first transmission route and the second route maintains the signal transmission performance properly even if the vehicle collides with the obstacle at its left face or its right face.

In the above-described wire harness arrangement structure, the vehicle may include a first engine frame which extends between the front end of the vehicle and the dash panel and a second engine frame which extends between the front end of the vehicle and the dash panel at a position which is spaced apart from the first engine frame in the second direction, the first route may be formed along the first engine frame, and the second route may be formed along the second engine frame. According to this structure, since the first route is formed along the first engine frame and the second route is formed along the second engine frame, the signal transmission loop is protected by the first engine frame and the second engine frame.

In the above-described wire harness arrangement structure, a first penetration hole and a second penetration hole may be formed at the dash panel, the second penetration hole may be provided at a position which is offset, in the second direction, from the first penetration hole, and the plural main wire harnesses may include a first wire harness which extends from the main control part toward the first penetration hole and a second wire harness which extends from the main control part toward the second penetration hole. According to this structure, since the plural main wire harnesses include the first wire harness extending from the main control part toward the first penetration hole and the second wire harness extending from the main control part toward the second penetration hole, either one of the first wire harness and the second wire harness maintains the signal transmission performance properly even if the vehicle collides with the obstacle at its left face or its right face.

In the above-described wire harness arrangement structure, the vehicle may include a reinforcing frame which extends in the second direction in back of the dash panel, and the first wire harness and the second wire harness may be provided to extend along the reinforcing frame. According to this structure, since the first wire harness and the second wire harness are provided to extend along the reinforcing frame, the signal transmission loop is protected by the reinforcing frame.

Other features, aspects, and advantages of the present invention will become apparent from the following description which refers to the accompanying drawings.

DETAILED DESCRIPTION OF THE INVENTION

Embodiment 1

The present inventors and other developed a control system which includes a main control part and plural component control parts. The main control part controls the plural component control parts totally. The plural component control parts respectively control their corresponding electric components (a brake, an engine, a transmission, or a steering, for example). The main control part sets motion targets (a target value of a braking force, an engine speed, a target value of a traction, a steering direction or a steering angle) of the electric components in accordance with traveling environments (conditions) of the vehicle. A command signal which represents the target motions is outputted to the plural component control parts from the main control part. The plural component control parts respectively control the corresponding electric components so that the corresponding electric components achieve (meet) the motion targets. Accordingly, the control system can contribute to an automatic driving of the vehicle greatly. Transmission of the command signals between the main control part and the plural component control parts is very important. For example, if the command signals from the main control part to the component control parts governing the engine control stop, the engine control is lost. In a first embodiment, an arrangement structure of a wire harness which attains the high reliability of the command-signal transmission will be described.

Figure 1:
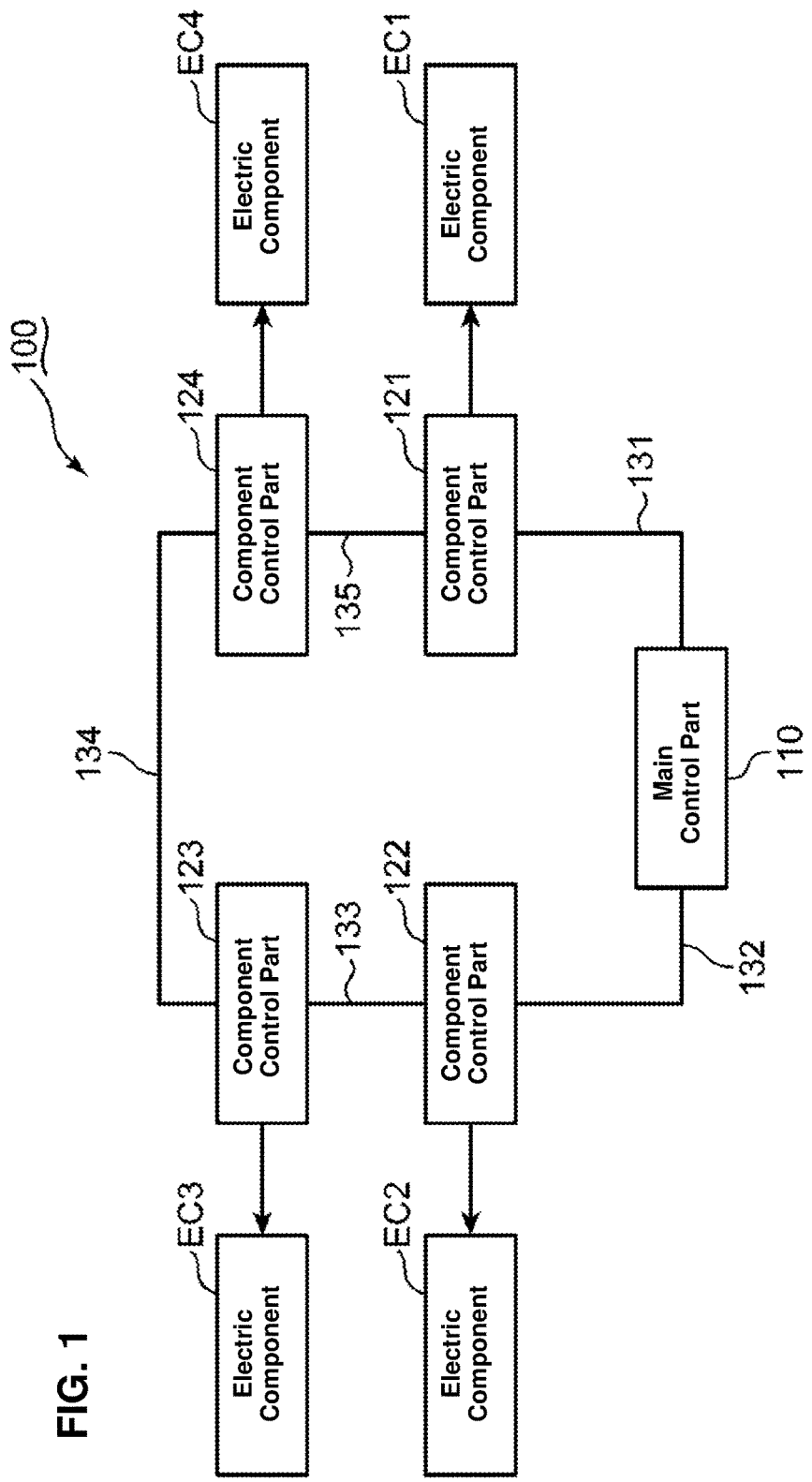
FIG. 1 is a conceptual block diagram of a wire harness arrangement structure of a first embodiment.

FIG. 1 is a conceptual block diagram of an arrangement structure of a wire harness of the first embodiment (hereafter, referred to as an arrangement structure 100). The arrangement structure 100 will be described referring to FIG. 1.

The arrangement structure 100 comprises a main control part 110, four component control parts 121, 122, 123, 124, and five wire harnesses 131-135. The wire harness 131 is connected to the main control part 110 and the component control part 121. The wire harness 133 is connected to the component control parts 122, 123. The wire harness 134 is connected to the component control parts 123, 124. The wire harness 135 is connected to the component control parts 124, 121. Accordingly, the wire harnesses 131-135 constitute a signal transmission loop (i.e., a loop-shaped signal transmission route) which extends from the main control part 110 and returns to the main control part 110 by way of the component control parts 121-124. In the present embodiment, plural main wire harnesses is exemplified by the wire harnesses 131-135.

FIG. 1 shows four electric components EC1, EC2, EC3, CE4 which govern a drive of a vehicle (not illustrated). The electric component EC1 may be one of the brake, the engine, the transmission, and the steering. The electric component EC2 may be another one of the brake, the engine, the transmission, and the steering. The electric component EC3 may be further another one of the brake, the engine, the transmission, and the steering. The electric component EC4 may be the last one of the brake, the engine, the transmission, and the steering.

The main control part 110 generates command signals to command the component control parts 121, 122, 123, 124. The command signals may represent targets of the motions of the electric components EC1, EC2, EC3, CE4. For example, the command signals may represent a braking force to be applied to the vehicle, a vehicle speed, a vehicle acceleration, a traction to be transmitted to a road surface from the vehicle, a traveling direction, or a vehicle steering angle. A doctrine of the present embodiment is not limited to a particular target to be represented by the command signal.

The main control part 110 outputs the command signals to the wire harnesses 131, 132. The command signals are transmitted to the component control parts 121-124 from the main control part 110 through the signal transmission loop constituted by the wire harnesses 131-135. The component control parts 121-124 respectively control the electric components EC1, EC2, EC3, EC4 in accordance with the command signals.

In a case where the electric component EC1 is the brake, the component control part 121 may adjust an oil pressure to be applied to a disc brake in accordance with the command signal. In a case where the electric component EC2 is the engine, the component control part 122 may adjust an ignition timing or speed of the engine in accordance with the command signal. In a case where the electric component EC3 is the transmission, the component control part 123 may change gears (a third gear to a fourth gear, for example) in accordance with the command signal. In a case where the electric component EC4 is the steering, the component control part 124 may rotate a steering shaft clockwise or counterclockwise by a specified angle in accordance with the command signal. The doctrine of the present embodiment is not limited to a particular control to be executed by the component control parts 121, 122, 123, 124.

When the wire harness 131 is broken, the command signals which the main control part 110 outputs to the wire harness 132 can pass through (flow down) the component control part 122, the wire harness 133, the component control part 123, the wire harness 134, the component control part 124, and the wire harness 135, in order, and finally reach the component control part 121. Accordingly, each of the component control parts 121-124 can receive the command signals even when the wire harness 131 is broken.

When the wire harness 132 is broken, the command signals which the main control part 110 outputs to the wire harness 131 can pass through (flow down) the component control part 121, the wire harness 135, the component control part 124, the wire harness 134, the component control part 123, and the wire harness 133, in order, and finally reach the component control part 122. Accordingly, each of the component control parts 121-124 can receive the command signals even when the wire harness 132 is broken.

When the wire harness 133 is broken, the command signal which the main control part 110 outputs to the wire harness 132 is transmitted to the component control part 122. The command signals which the main control part 110 outputs to the wire harness 131 can pass through (flow down) the component control part 121, the wire harness 135, the component control part 124, and the wire harness 134, in order, and finally reach the component control part 123. Accordingly, each of the component control parts 121-124 can receive the command signals even when the wire harness 133 is broken.

When the wire harness 134 is broken, the command signals which the main control part 110 outputs to the wire harness 131 can pass through (flow down) the component control part 121 and the wire harness 135 and finally reach the component control part 124. The command signals which the main control part 110 outputs to the wire harness 132 can pass through (flow down) the component control part 122 and the wire harness 133 and finally reach the component control part 12. Accordingly, each of the component control parts 121-124 can receive the command signals even when the wire harness 134 is broken.

When the wire harness 135 is broken, the command signal which the main control part 110 outputs to the wire harness 131 is transmitted to the component control part 121. The command signals which the main control part 110 outputs to the wire harness 132 can pass through (flow down) the component control part 122, the wire harness 133, the component control part 123, and the wire harness 134, in order, and finally reach the component control part 124. Accordingly, each of the component control parts 121-124 can receive the command signals even when the wire harness 135 is broken.

Embodiment 2

The main control part may be connected to various control units to control the vehicle. In this case, the plural wire harnesses installed to the vehicle may constitute a signal transmission loop and plural signal transmission lines (i.e., a single-line signal transmission route). The component control parts to govern the drive of the vehicle are connected to the signal transmission loop as described relating to the first embodiment. The plural sub control parts to govern controls of the other components may be connected to the plural signal transmission lines, respectively. In the second embodiment, an exemplified wire harness arrangement structure including the single signal transmission loop and the plural signal transmission lines will be described.

Figure 2:
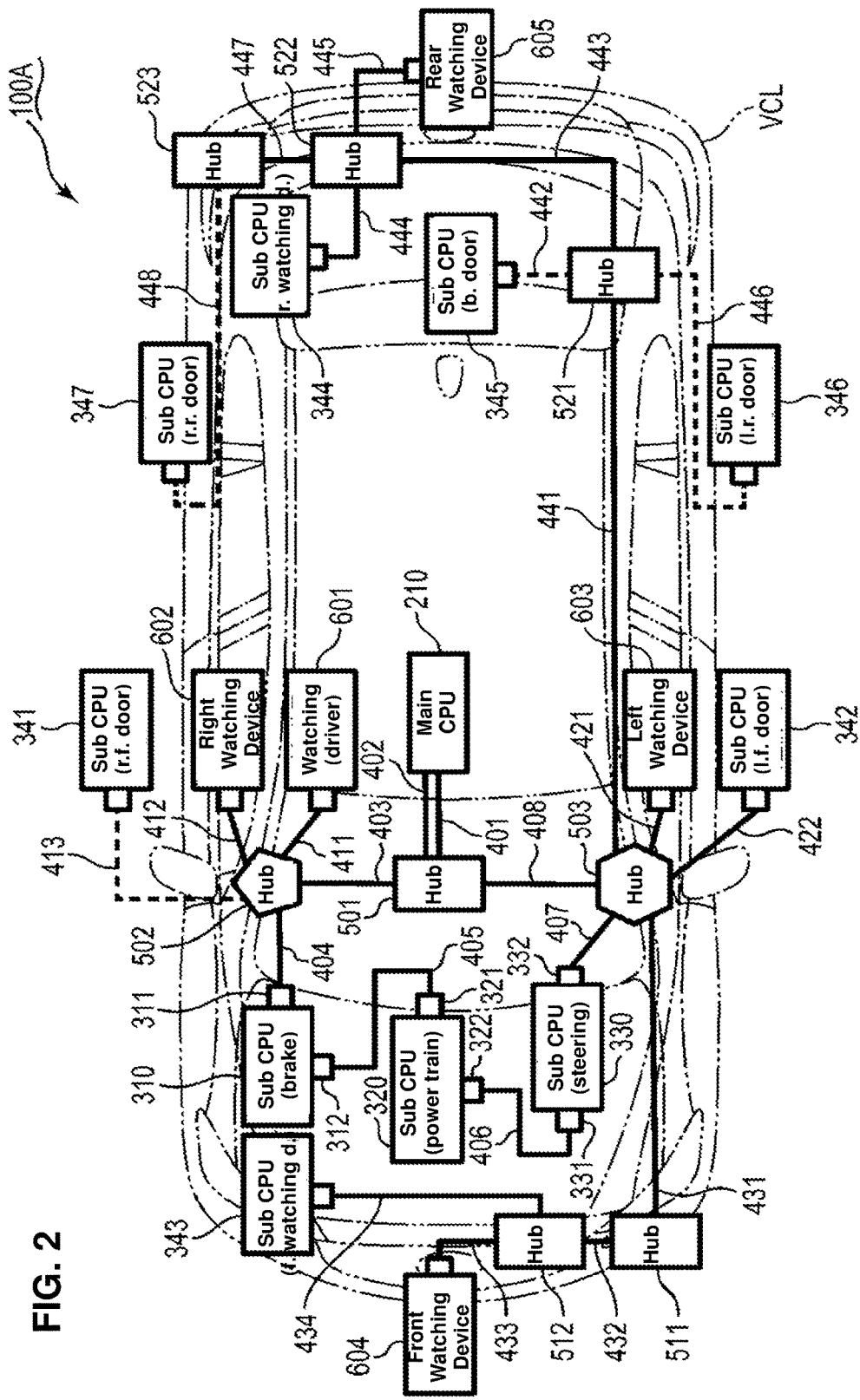
FIG. 2 is a conceptual block diagram of a wire harness arrangement structure of a second embodiment.

FIG. 2 is a conceptual block diagram of a wire harness arrangement structure of the second embodiment (hereafter, referred to as an arrangement structure 100A). The arrangement structure 100A will be described referring to FIGS. 1 and 2.

The arrangement structure 100A comprises a main CPU 210, sub CPUs 310, 320, 330, wire harnesses 401-407, and hubs 501-503. The main CPU corresponds to the main control part 110 described referring to FIG. 1. The description of the main control part 110 may be applied to the main CPU 210.

The sub CPU 310 which is arranged on the right of the sub CPU 320 controls the brake (not illustrated) which is installed to a vehicle VCL. The sub CPU 310 corresponds to at least one of the component control parts 121, 122, 123, 124 described referring to FIG. 1. The descriptions of the component control parts 121, 122, 123, 124 may be applied to the sub CPU 310.

The sub CPU 320 which is arranged between the sub CPUs 310, 320 controls a power train (the engine or the transmission, not illustrated) which is installed to the vehicle VCL. The sub CPU 320 corresponds to at least one of the component control parts 121, 122, 123, 124 described referring to FIG. 1. The descriptions of the component control parts 121, 122, 123, 124 may be applied to the sub CPU 320.

The sub CPU 330 which is arranged on the left of the sub CPU 320 controls the steering (not illustrated) which is installed to the vehicle VCL. The sub CPU 330 corresponds to at least one of the component control parts 121, 122, 123, 124 described referring to FIG. 1. The descriptions of the component control parts 121, 122, 123, 124 may be applied to the sub CPU 330.

The wire harnesses 401, 402 are connected to the main CPU 210 and the hub 501. The hub 502 is arranged on the right of the hub 501. The wire harness 403 is connected to the hubs 501, 502. The hub 503 is arranged on the left of the hub 501. A wire harness 408 is connected to the hubs 501, 503.

The sub CPU 310 includes plural terminals 311, 312. The wire harness 404 extends from the hub 502 to a terminal 311. The sub CPU 320 includes plural terminals 321, 322. The wire harness 405 extends from a terminal 312 of the sub CPU 310 to a terminal 321 of the sub CPU 320. The sub CPU 330 includes plural terminals 331, 332. The wire harness 406 extends from a terminal 322 of the sub CPU 320 to a terminal 331 of the sub CPU 330. The wire harness 407 extends from a terminal 332 of the sub CPU 330 to the hub 503. Accordingly, the wire harnesses 401-403 and hubs 501-503 constitute the signal transmission loop described relating to the first embodiment.

The main CPU 210 outputs the command signals to the wire harnesses 401, 402. Even if either one of the wire harnesses 401, 402 is broken, the command signals can reach the hub 501 through the other one of the wire harnesses 401, 402. Then, the command signals are transmitted to the sub CPUs 310-330 through the wire harnesses 403-408 and the hubs 502, 503.

There may be case where the wire harnesses 403, 404 are broken when the vehicle VCL collides with an obstacle at its right face. In this case, the command signals outputted from the main CPU 210 are transmitted to the hub 501 through the wire harnesses 401, 402. The command signals pass through the wire harness 408, the hub 503, and the wire harness 407, in order, and are transmitted to the sub CPU 330. Then, the command signals are transmitted from the sub CPU 330 to the sub CPU 320 through the wire harness 406. After this, the command signals are further transmitted from the sub CPU 320 to the sub CPU 310 through the wire harness 405. Accordingly, the sub CPUs 310-330 can receive the command signals even when the wire harnesses 403, 404 are broken.

There may be case where the wire harness 405 is broken when the vehicle VCL collides with the obstacle at its right face. In this case, the command signals outputted from the main CPU 210 are transmitted to the hub 501 through the wire harnesses 401, 402. The sub CPU 310 can receive the command signals through the wire harnesses 403, 404 and hub 502. The sub CPU 330 can receive the command signals through the wire harnesses 408, 407 and hub 503. Then, the command signals are transmitted from the sub CPU 330 to the sub CPU 320 through the wire harness 406. Accordingly, the sub CPUs 310-330 can receive the command signals even when the wire harness 405 is broken.

There may be case where the wire harnesses 407, 408 are broken when the vehicle VCL collides with an obstacle at its left face. In this case, the command signals outputted from the main CPU 210 are transmitted to the hub 501 through the wire harnesses 401, 402. The command signals pass through the wire harness 403, the hub 502, and the wire harness 404, in order, and are transmitted to the sub CPU 310. Then, the command signals are transmitted from the sub CPU 310 to the sub CPU 320 through the wire harness 405. After this, the command signals are further transmitted from the sub CPU 320 to the sub CPU 330 through the wire harness 406. Accordingly, the sub CPUs 310-330 can receive the command signals even when the wire harnesses 407, 408 are broken.

There may be case where the wire harness 406 is broken when the vehicle VCL collides with the obstacle at its left face. In this case, the command signals outputted from the main CPU 210 are transmitted to the hub 501 through the wire harnesses 401, 402. The sub CPU 330 can receive the command signals through the wire harnesses 408, 407 and hub 503. The sub CPU 310 can receive the command signals through the wire harnesses 403, 404 and hub 502. Then, the command signals are transmitted from the sub CPU 310 to the sub CPU 320 through the wire harness 404. Accordingly, the sub CPUs 310-330 can receive the command signals even when the wire harness 406 is broken.

The arrangement structure 100A comprises a watching (monitoring) device 601, a right watching (monitoring) device 602, a sub CPU 341, and wire harnesses 411, 412, 413. The wire harness 411 extends between the watching device 601 and the hub 502 and constitutes a signal transmission line. The wire harness 412 extends between the right watching device 602 and the hub 502 and constitutes another signal transmission line. The wire harness 413 extends between the sub CPU 341 and the hub 502 and constitutes further another signal transmission line.

The watching device 601 may be any device to monitor a driver. For example, the watching device 601 may be a camera device to watch (monitor) a position of a driver's pupil. Alternatively, the watching device 601 may be a camera device to watch a driving position of the driver. Further, the watching device 601 may be a weight measuring device to watch a change of a position a driver's gravity center in place. The doctrine of the present embodiment is not limited to a particular device used as the watching device 601.

The watching device 601 generates a signal for representing a state of the driver. The signal is transmitted to the main CPU 210 through the wire harnesses 411, 403, 402, 401 and the hubs 502, 501. The main CPU 210 may generate the command signal based on the signal generated by the watching device 601. If the signal generated by the watching device 601 represents a problem (a poor physical condition, for example) of the driver, the main CPU 210 generates the command signal to command a speed reduction of the vehicle VCL. The command signal is transmitted to the sub CPUs 310, 320 with high reliability as described above. Consequently, the sub CPU 310 controls the brake so that the braking force can be increased. The sub CPU 320 controls the power train so that the speed can be decreased.

The right watching device 602 may be a device to monitor a state of a right side of the vehicle VCL. For example, the right watching device 602 may be a camera device to pick up an image on the right side of the vehicle VCL. Alternatively, the right watching device 602 may be a sensor which radiates a light beam toward the right side of the vehicle VCL and detects existence/nonexistence of an obstacle based on reflection of this light beam. The doctrine of the present embodiment is not limited to a particular device used as the right watching device 602.

The right watching device 602 generates a signal for representing a right-side state of the vehicle VCL. The signal is transmitted to the main CPU 210 through the wire harnesses 412, 403, 402, 401 and the hubs 502, 501. The main CPU 210 may generate the command signal based on the signal generated by the right watching device 602. The command signal is transmitted to the sub CPUs 330, 320, 310 with high reliability as described above. Consequently, in a case where the signal generated by the right watching device 602 represents an obstacle existing on the right side of the vehicle VCL, the sub CPU 330 controls the steering so that any collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 341 may control a right front door of the vehicle VCL. For example, the sub CPU 341 may move a window of the right front door vertically. The sub CPU 341 may control a lock of the right front door. When the driver operates an operational switch (not illustrated) installed to the vehicle VCL to command the window of the right front door to lower, the main CPU 210 generates the command signal to command lowering of the window of the right front door. The command signal is transmitted to the sub CPU 341 through the wire harnesses 401, 402, 403, 413 and the hubs 501, 502. The sub CPU 341 moves the widow of the right front door downward in accordance with the command signal.

The arrangement structure 100A comprises a left watching (monitoring) device 603, a sub CPU 342, and wire harnesses 421, 422. The wire harness 421 extends between the left watching device 603 and the hub 503 and constitutes a signal transmission line. The wire harness 422 extends between the sub CPU 342 and the hub 503 and constitutes another signal transmission line.

The left watching device 603 may be a device to monitor a state of a left side of the vehicle VCL. For example, the left watching device 603 may be a camera device to pick up an image on the left side of the vehicle VCL. Alternatively, the left watching device 603 may be a sensor which radiates a light beam toward the left side of the vehicle VCL and detects existence/nonexistence of an obstacle based on reflection of this light beam. The doctrine of the present embodiment is not limited to a particular device used as the left watching device 603.

The sub CPU 342 may control a left front door of the vehicle VCL. For example, the sub CPU 342 may move a window of the left front door vertically. The sub CPU 342 may control a lock of the left front door. When the driver operates an operational switch (not illustrated) installed to the vehicle VCL to command the window of the left front door to lower, the main CPU 210 generates the command signal to command lowering of the window of the left front door. The command signal is transmitted to the sub CPU 342 through the wire harnesses 401, 402, 408, 422 and the hubs 501, 503. The sub CPU 342 moves the widow of the left front door downward in accordance with the command signal.

The arrangement structure 100A comprises a front watching device 604, a sub CPU 343, hubs 511, 512, and wire harnesses 431, 432, 433, 434. The wire harness 431 extends between the hubs 503, 511. The wire harness 432 extends between the hubs 511, 512. The wire harness 433 extends between the hub 512 and the front watching device 604. The wire harnesses 431, 432, 433 and the hubs 511, 512 constitute a signal transmission line. The wire harness 434 extends between the hub 512 and the sub CPU 343. The wire harnesses 431, 432, 434 and the hubs 511, 512 constitute another signal transmission line.

The front watching device 604 may be a device to monitor a state of a front side of the vehicle VCL. For example, the front watching device 604 may be a camera device to pick up an image on the front side of the vehicle VCL. Alternatively, the front watching device 604 may be a sensor which radiates a light beam toward the front side of the vehicle VCL and detects existence/nonexistence of an obstacle based on reflection of this light beam. The doctrine of the present embodiment is not limited to a particular device used as the front watching device 604.

In a case where the front watching device 604 is a camera device, image data generated by the camera device may be transmitted to the sub CPU 343 through the wire harnesses 433, 434. The sub CPU 343 may analyze the image data and determine existence/nonexistence of the obstacle. A signal representing this determination result may be transmitted to the main CPU 210 from the sub CPU 343 through the wire harnesses 434, 432, 431, 408, 401, 402 and the hubs 512, 511, 503, 501. The main CPU 210 may generate the command signal based on the signal representing the determination result. The command signal is transmitted to the sub CPUs 330, 320, 310 with high reliability as described above. Consequently, in a case where the signal representing the determination result represents the existence of the obstacle on the front side of the vehicle VCL, the sub CPU 330 controls the steering so that collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 343 may control the front watching device 604. For example, the sub CPU 343 may control a watching direction of the camera device used as the front watching device 604. Alternatively, the sub CPU 343 may control a light-beam radiation direction of the sensor used as the front watching device 604.

The arrangement structure 100A comprises a rear watching device 605, sub CPUs 344, 345, hubs 521, 522, and wire harnesses 441, 442, 443, 444, 445. The wire harness 441 extends between the hubs 503, 521. The wire harness 442 extends between the hub 521 and the sub CPU 345. The wire harnesses 441, 442 and the hub 521 constitute a signal transmission line.

The sub CPU 345 may control a back door of the vehicle VCL. For example, the sub CPU 345 may control a lock of the back door. When the driver operates an operational switch (not illustrated) installed to the vehicle VCL to command the back door to be released, the main CPU 210 generates the command signal to command releasing of the back door. The command signal is transmitted to the sub CPU 345 through the wire harnesses 401, 402, 408, 441, 442 and the hubs 503, 521. The sub CPU 345 releases the lock of the back door in accordance with the command signal.

The wire harness 443 extends between the hubs 521, 522. The wire harness 445 extends between the hub 522 and the rear watching device 605. The wire harnesses 441, 443, 445 and the hubs 521, 522 constitute a signal transmission line.

The front watching device 605 may be a device to monitor a state of a rear side of the vehicle VCL. For example, the rear watching device 605 may be a camera device to pick up an image on the rear side of the vehicle VCL. Alternatively, the rear watching device 605 may be a sensor which radiates a light beam toward the rear side of the vehicle VCL and detects existence/nonexistence of an obstacle based on reflection of this light beam. The doctrine of the present embodiment is not limited to a particular device used as the rear watching device 605.

The wire harness 444 extends between the hub 522 and the sub CPU 344. The wire harnesses 441, 443, 444 and the hubs 521, 522 constitute a signal transmission line.

In a case where the front watching device 605 is a camera device, image data generated by the camera device may be transmitted to the sub CPU 344 through the wire harnesses 445, 444 and the hub 522. The sub CPU 344 may analyze the image data and determine existence/nonexistence of the obstacle. A signal representing this determination result may be transmitted to the main CPU 210 from the sub CPU 344 through the wire harnesses 444, 443, 441, 408, 401, 402 and the hubs 522, 521, 503, 501. The main CPU 210 may generate the command signal based on the signal representing the determination result. The command signal is transmitted to the sub CPUs 330, 320, 310 with high reliability as described above. Consequently, in a case where the signal representing the determination result represents the existence of the obstacle on the rear side of the vehicle VCL, the sub CPU 330 controls the steering so that any collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 344 may control the rear watching device 605. For example, the sub CPU 344 may control a watching direction of the camera device used as the rear watching device 604. Alternatively, the sub CPU 344 may control a light-beam radiation direction of the sensor used as the rear watching device 605.

The arrangement structure 100A comprises sub CPUs 346, 347, a hub 523, and wire harnesses 446, 447, 448. The wire harness 446 extends between the hub 521 and the sub CPU 346 and constitutes a signal transmission line.

The sub CPU 346 may control a left rear door of the vehicle VCL. For example, the sub CPU 346 may move a window of the left rear door vertically. The sub CPU 346 may control a lock of the left rear door. When the driver operates an operational switch (not illustrated) installed to the vehicle VCL to command the window of the left rear door to lower, the main CPU 210 generates the command signal to command lowering of the window of the left rear door. The command signal is transmitted to the sub CPU 346 through the wire harnesses 401, 402, 408, 441, 446 and the hubs 501, 503, 521. The sub CPU 346 moves the widow of the left rear door downward in accordance with the command signal.

The wire harness 447 extends between the hubs 522, 523. The wire harness 448 extends between the hub 523 and the sub CPU 347. The wire harnesses 447, 448 and the hub 523 constitute a signal transmission line.

The sub CPU 347 may control a right rear door of the vehicle VCL. For example, the sub CPU 347 may move a window of the right rear door vertically. The sub CPU 347 may control a lock of the right rear door. When the driver operates an operational switch (not illustrated) installed to the vehicle VCL to command the window of the right rear door to lower, the main CPU 210 generates the command signal to command lowering of the window of the right rear door. The command signal is transmitted to the sub CPU 347 through the wire harnesses 401, 402, 408, 441, 443, 447, 448 and the hubs 501, 503, 521, 522, 523. The sub CPU 347 moves the widow of the right rear door downward in accordance with the command signal.

As shown in FIG. 2, the signal transmission loop is used only for signal transmitting to the sub CPUs 310, 320, 330. The other sub CPUs 341-347 perform communication with the main CPU 210 through the signal transmission line. Accordingly, the gross weight of the wire harnesses installed to the vehicle VCL does not become excessively large. In the present embodiment, the sub control part is exemplified by one of the sub CPUs 341-347.

The signal transmission routes shown by solid lines in FIG. 2 may be designed based on a high-speed communication path (Ethernet, for example). The signal transmission routes shown by broken lines in FIG. 2 may be designed based on a low-speed communication path (CAN: Control Area Network, for example).

Embodiment 3

Designers can design various wire harness arrangement structures based on the design doctrine described relating to the above-described embodiments. In a third embodiment, an exemplified arrangement structure of the wire harness will be described.

Figure 3:
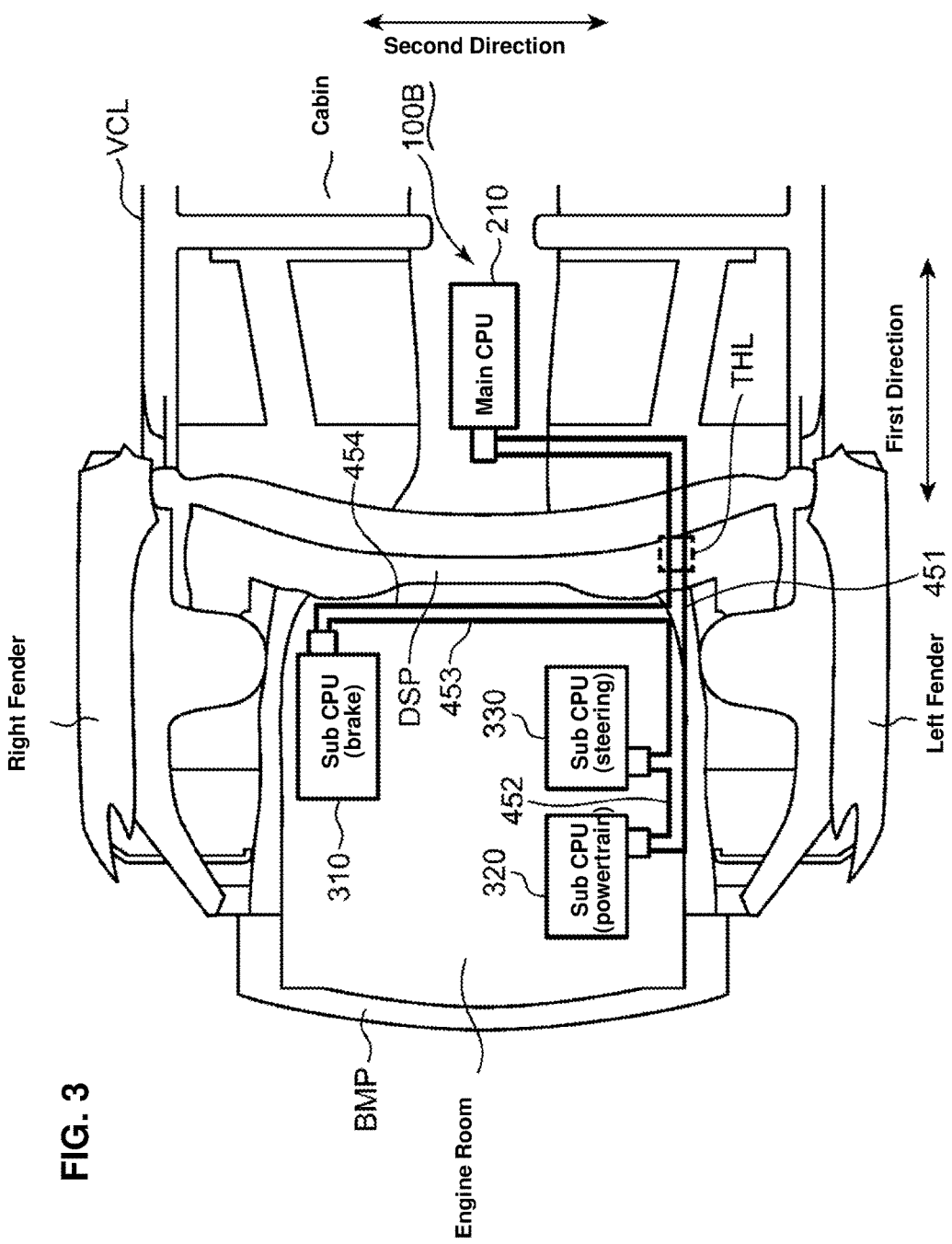
FIG. 3 is a conceptual block diagram of a wire harness arrangement structure of a third embodiment.

FIG. 3 is a conceptual block diagram of the wire harness arrangement structure (hereafter, referred to as an arrangement structure 100B) of the third embodiment. The arrangement structure 100B will be described referring to FIG. 3. The descriptions of the above-described embodiments are applied to elements of the third embodiment which are denoted by the same reference characters as the above-described embodiments.

FIG. 3 is a schematic plan view of the vehicle VCL. The vehicle VCL includes a bumper BMP and a dash panel DSP. The bumper BMP forms a front end of the vehicle VCL. The dash panel DSP partitions a space inside the vehicle VCL into an engine room and a cabin. The engine room is formed between the dash panel DSP and the bumper BMP. The cabin is formed in back of the dash panel DSP.

The arrangement structure 100B comprises the main CPU 20 and the sub CPUs 310, 320, 330 similarly to the second embodiment. The description of the second embodiment is applied to these elements.

The main CPU 210 is arranged in the cabin. Since the cabin is designed to protect the driver, it is configured to be harder than the engine room. Accordingly, the main CPU 210 is protected properly from the collision of the vehicle VCL with the obstacle.

The sub CPUs 310, 320, 330 are arranged in the engine room. Since the sub CPUs 310, 320, 330 are electrically connected to the main CPU 210 by the signal transmission loop in accordance with the design doctrine of the above-described embodiments, the communication of the sub CPUs 310, 320, 330 with the main CPU 210 is maintained properly under the collision of the vehicle VCL with the obstacle.

The dash panel DSP has a penetration hole THL. The penetration hole THL is formed at a position which is closer to a left fender enclosing a left front wheel than a right fender enclosing a right front wheel. The sub CPU 310 is positioned more closely to the right fender than the sub CPUs 320, 330. The sub CPUs 320, 330 are positioned more closely to the left fender than the sub CPU 310. The signal transmission loop electrically connects the main CPU 210 and the sub CPUs 310, 320, 330 through the penetration hole THL.

The arrangement structure 100B includes wire harnesses 451, 452, 453, 454. The wire harnesses 451, 452, 453, 454 constitute the above-described signal transmission loop.

In the following description, a direction directed from the dash panel DSP toward the bumper BMP (i.e., a traveling direction of the advancing vehicle VCL) or its reverse direction will be referred to as a "first direction." A direction perpendicular to the first direction (i.e., a vehicle width direction) will be referred to as a "second direction."

The wire harness 451 extends leftward (i.e., the second direction) from the main CPU 210, and is bent forward (i.e., the first direction) at a position located near the left fender. The wire harness 451 extends forward along the left fender and passes through the penetration hole THL. The wire harness 451 extends further forward and is connected to the sub CPU 320 which is arranged between the sub CPU 330 and the bumper BMP.

The sub CPU 330 is arranged between the sub CPU 320 and the dash panel DSP. The wire harness 452 extends rearward (i.e., the first direction) from the sub CPU 320 and is connected to the sub CPU 330.

The wire harness 453 extends rearward from the sub CPU 330, and is bent rightward (i.e., the second direction) at a position which is located just in front of the dash panel DSP. The wire harness 453 extends rightward along the dash panel DSP and is connected to the sub CPU 310.

The wire harness transmission path 454 extends leftward from the sub CPU 310 along the dash panel DSP, and is bent rearward at a positon located near the penetration hole THL. The wire harness 454 is inserted into the penetration hole THL and extends rearward in the cabin. The wire harness 454 is bent rightward in the cabin and connected to the main CPU 210.

Embodiment 4

The signal transmission loop described relating to the third embodiment includes two wire harnesses which extend in the first direction at a position located near the left fender. Accordingly, there may be a case where the two wire harnesses get broken at the same time when the left fender of the vehicle collides with an obstacle. In a fourth embodiment, an exemplified arrangement structure of the wire harness which can maintain the high reliability of the signal transmission performance even under the vehicle side collision will be described.

Figure 4:
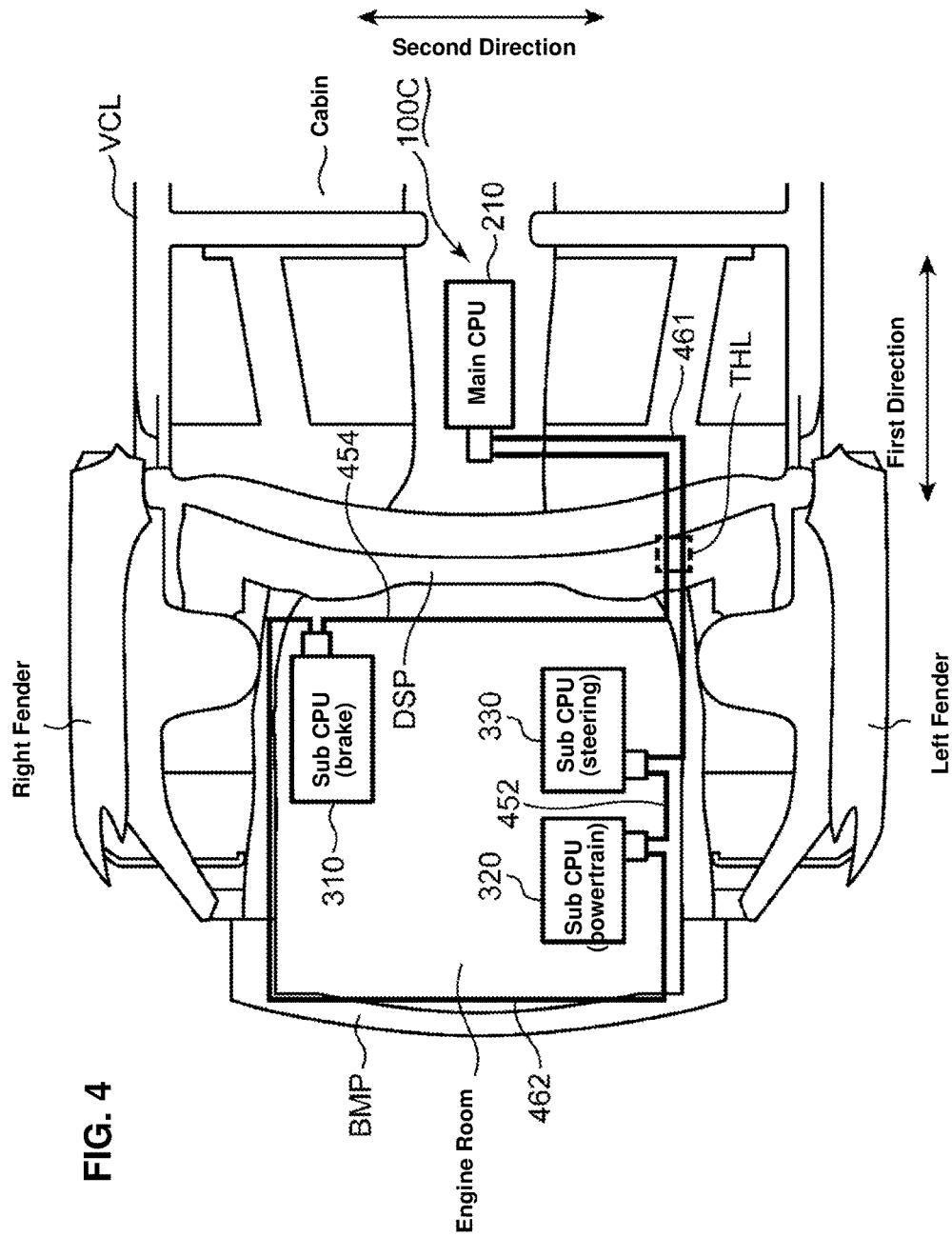
FIG. 4 is a conceptual block diagram of a wire harness arrangement structure of a fourth embodiment.

FIG. 4 is a conceptual block diagram of the wire harness arrangement structure (hereafter, referred to as an arrangement structure 100C) of the fourth embodiment. The arrangement structure 100C will be described referring to FIG. 4. The descriptions of the above-described embodiments are applied to elements of the fourth embodiment which are denoted by the same reference characters as the above-described embodiments.

The arrangement structure 100C comprises the main CPU 20 and the sub CPUs 310, 320, 330 similarly to the second embodiment. The description of the second embodiment is applied to these elements.

The arrangement structure 100C further comprises the wire harnesses 452, 454 similarly to the third embodiment. The description of the third embodiment is applied to these wire harnesses 452, 454.

The arrangement structure 100C further comprises wire harnesses 461, 462. The wire harness 461 extends leftward (i.e., the second direction) from the main CPU 210 and is bent forward (i.e., the first direction) at a position located near the left fender. The wire harness 461 extends forward along the left fender and passes through the penetration hole THL. The wire harness 461 extends further forward and is connected to the sub CPU 330.

The wire harness 462 extends forward from the sub CPU 320 along the left fender and is bent rightward (i.e., the second direction) at a position located near the bumper BMP. The wire harness 462 extends rightward along the bumper BMP and is bent rearward at a position located near a right end of the bumper BMP. The wire harness 462 extends rearward along the right fender and is connected to the sub CPU 310.

Part of the wire harness 461, part of the wire harness 452, and part of the wire harness 462 constitute a signal transmission route which extends in the first direction at a position located near the left fender. Since this signal transmission route is largely far from the right fender, it is difficult that this signal transmission route is shut down (broken) by the collision of the right fender with an obstacle. In the present embodiment, the first route is exemplified by the signal transmission route extending in the first direction at the position located near the left fender (the part of the wire harness 461, the part of the wire harness 452, and the part of the wire harness 462).

Another part of the wire harness 462 constitutes a signal transmission route which extends in the first direction at a position located near the right fender. Since this signal transmission route is largely far from the left fender, it is difficult that this signal transmission route is shut down by the collision of the left fender with an obstacle. In the present embodiment, the second route is exemplified by the signal transmission route extending in the first direction at the position located near the right fender (the part of the wire harness 462).

As shown in FIG. 4, the sub CPUs 310, 320, 330 are positioned between the two signal transmission routes extending in the first direction. Even if the signal transmission loop is partially shut down under a light collision where the sub CPUs 310, 320, 330 do not get broken, the signal transmission performance can be maintained. Accordingly, the vehicle VCL can maintain the basic performances (i.e., "proceeding," "retreating," "curving," and/or "stopping").

Embodiment 5

The signal transmission loop described relating to the fourth embodiment includes the wire harness which extends in the second direction at the position located near the bumper. Accordingly, there may be a case where the wire harness is broken when the vehicle's bumper collides with an obstacle. In the fifth embodiment, an exemplified arrangement structure of the wire harness in which it is difficult that the wire harness are broken even under the bumper's collision will be described.

Figure 5:
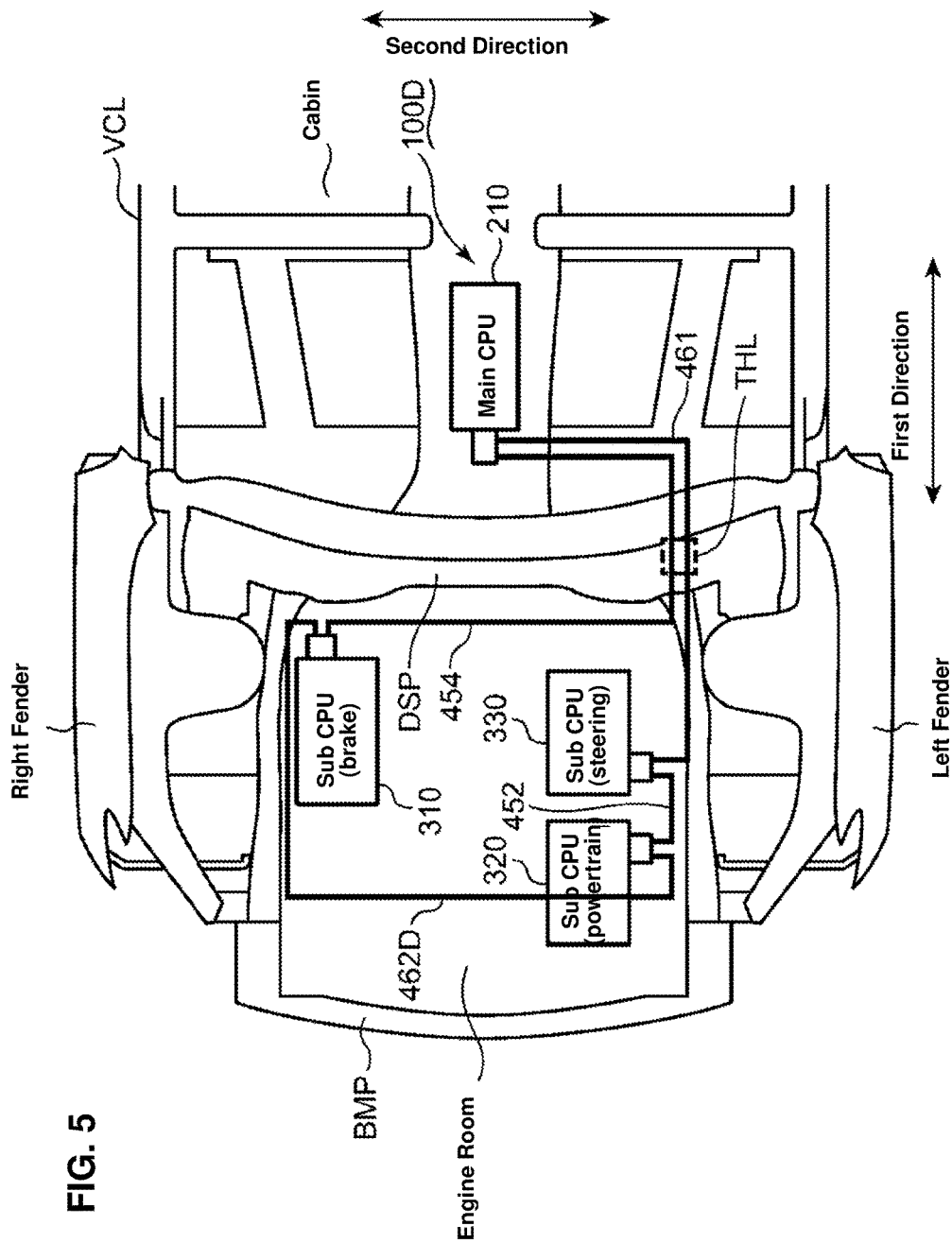
FIG. 5 is a conceptual block diagram of a wire harness arrangement structure of a fifth embodiment.

FIG. 5 is a conceptual block diagram of the wire harness arrangement structure (hereafter, referred to as an arrangement structure 100D) of the fifth embodiment. The arrangement structure 100D will be described referring to FIG. 5. The descriptions of the above-described embodiments are applied to elements of the fifth embodiment which are denoted by the same reference characters as the above-described embodiments.

The arrangement structure 100D comprises the main CPU 210 and the sub CPUs 310, 320, 330 similarly to the second embodiment. The description of the second embodiment is applied to these elements.

The arrangement structure 100D further comprises the wire harnesses 452, 454 similarly to the third embodiment. The description of the third embodiment is applied to these wire harnesses 452, 454.

The arrangement structure 100D further comprises the wire harness 461 similarly to the fourth embodiment. The description of the fourth embodiment is applied to this wire harness 461.

The arrangement structure 100D further comprises a wire harness 462D. The wire harness 462D extends rightward (i.e., the second direction) so as to overlap the sub CPU 320. Accordingly, the signal transmission loop is largely far from the bumper BMP. Accordingly, it is difficult that the wire harness gets broken even when the bumper BMP collides with the obstacle. The wire harness 462D is bent rearward (i.e., the first direction) at a position located near the right fender. The wire harness 462D extends rearward along the right fender and is connected to the sub CPU 310 finally.

Embodiment 6

According to the design doctrine described relating to the third embodiment and the fifth embodiment, the two wire harnesses extending from the main CPU extend in parallel. Accordingly, when the vehicle left-side face collision occurs, there may be a case where these wire harnesses get broken at the same time. In the sixth embodiment, an improved arrangement structure will be described.

Figure 6:
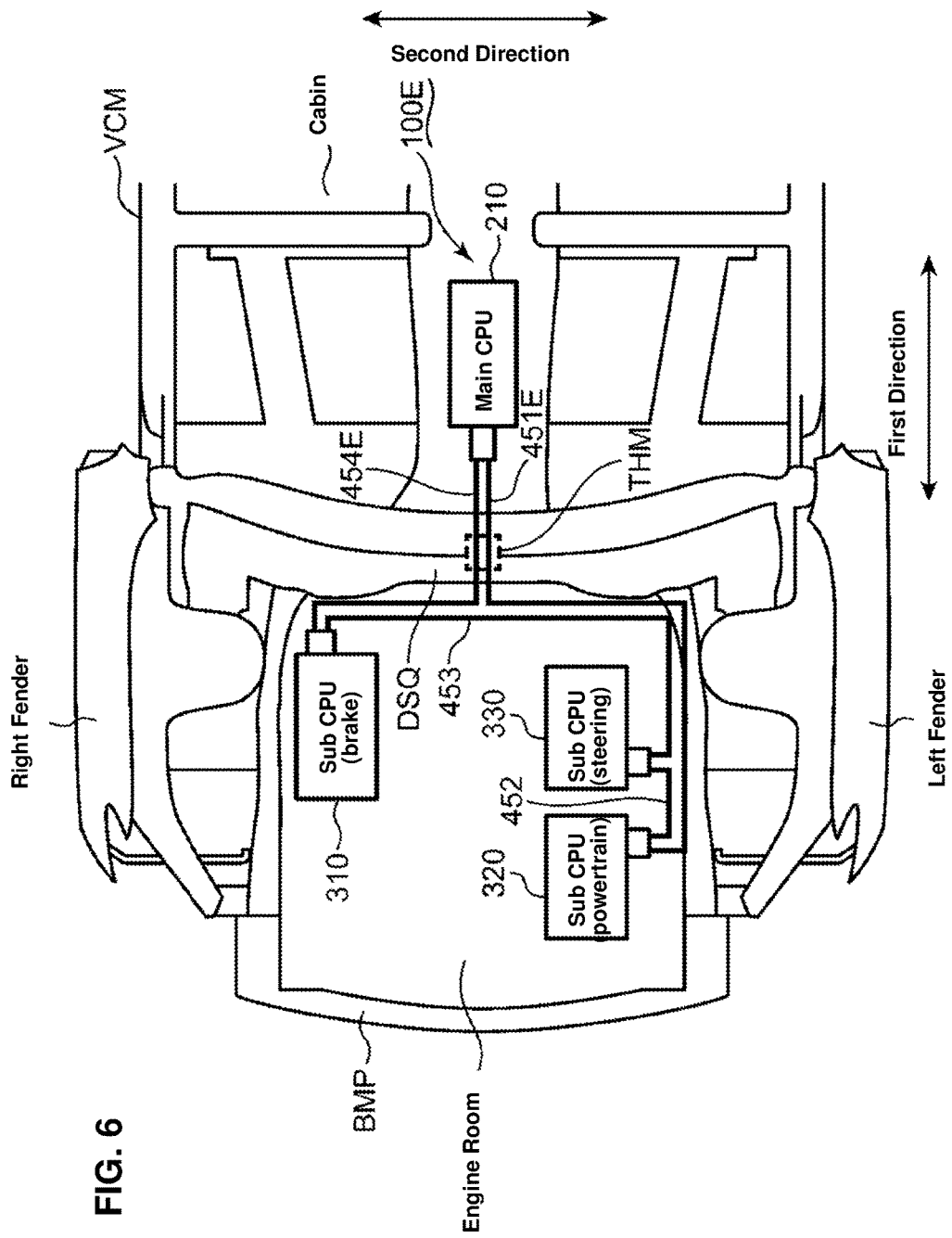
FIG. 6 is a conceptual block diagram of a wire harness arrangement structure of a sixth embodiment.

FIG. 6 is a conceptual block diagram of the wire harness arrangement structure (hereafter, referred to as an arrangement structure 100E) of the sixth embodiment. The arrangement structure 100E will be described referring to FIG. 6. The descriptions of the above-described embodiments are applied to elements of the sixth embodiment which are denoted by the same reference characters as the above-described embodiments.

FIG. 6 is a schematic plan view of a vehicle VCM. The vehicle VCM includes the bumper BMP similarly to the third embodiment. The description of the third embodiment is applied this bumper BMP.

The vehicle VCM includes a dash panel DSQ. The dash panel DSQ partitions a space inside the vehicle VCM into an engine room and a cabin. The engine room is formed between the dash panel DSQ and the bumper BMP. The cabin is formed in back of the dash panel DSQ.

The dash panel DSQ has a penetration hole THM. The penetration hole THM is formed at a central portion, in the vehicle width direction (i.e., the second direction), of the dash panel DSQ, which is different from the third embodiment.

The arrangement structure 100E comprises the main CPU 210 and the sub CPUs 310, 320, 330 similarly to the second embodiment. The description of the second embodiment is applied to these elements.

The arrangement structure 100E further comprises the wire harnesses 452, 453 similarly to the third embodiment. The description of the third embodiment is applied to these wire harnesses 452, 453.

The arrangement structure 100E further comprises wire harnesses 451E, 454E. The penetration hole THM is formed in front of the main CPU 210. The wire harnesses 451E, 454E extend forward (i.e., the first direction) from the main CPU 210 and is inserted into the penetration hole THM.

The wire harness 451E is bent leftward (i.e., the second direction) in front of the penetration hole THM. Inside the engine room, the wire harness 451E extends leftward along the dash panel DSQ and is bent forward at a position located near the left fender. The wire harness 451E extends forward along the left fender and is connected to the sub CPU 320.

The wire harness 454E is bent rightward (i.e., the second direction) in front of the penetration hole THM. Inside the engine room, the wire harness 454E extends rightward along the dash panel DSQ and is bent forward at a position located near the right fender. The wire harness 454E is connected to the sub CPU 310 finally.

Since the wire harnesses 451E, 454E extending forward from the main CPU 210 are positioned at a central portion, in the vehicle width direction, of the vehicle, it is difficult that these harnesses are damaged by the collision from the side of the vehicle.

Embodiment 7

Designers may make another signal transmission loop by combining the design doctrines described relating to the fourth embodiment and the sixth embodiment. In a seventh embodiment, an improved arrangement structure will be described.

Figure 7:
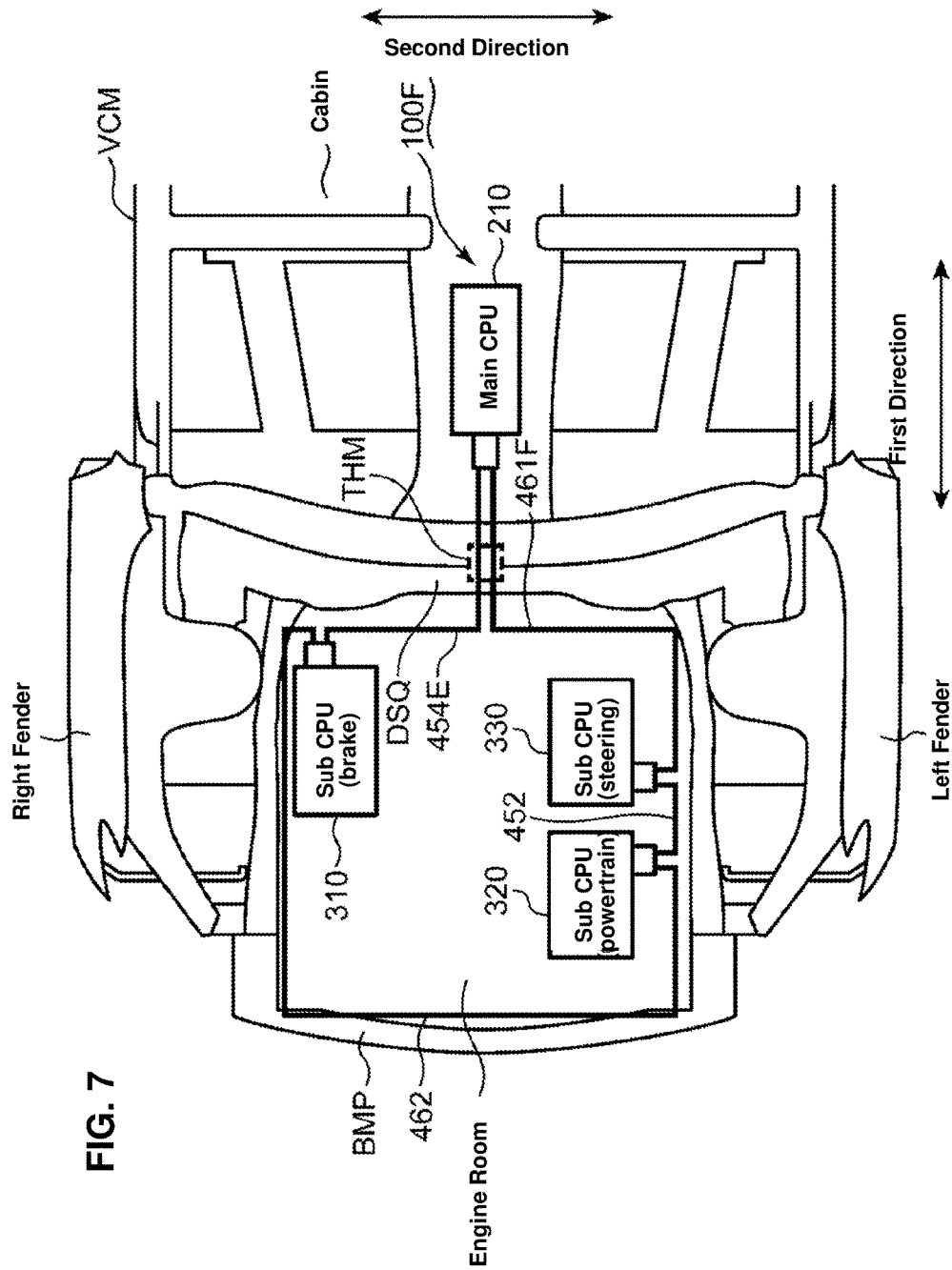
FIG. 7 is a conceptual block diagram of a wire harness arrangement structure of a seventh embodiment.

FIG. 7 is a conceptual block diagram of the wire harness arrangement structure (hereafter, referred to as an arrangement structure 100F) of the seventh embodiment. The arrangement structure 100F will be described referring to FIG. 7. The descriptions of the above-described embodiments are applied to elements of the seventh embodiment which are denoted by the same reference characters as the above-described embodiments.

The arrangement structure 100F is installed to the vehicle VCM similarly to the sixth embodiment. The description of the sixth embodiment is applied to the vehicle VCM.

The arrangement structure 100F comprises the main CPU 210 and the sub CPUs 310, 320, 330 similarly to the second embodiment. The description of the second embodiment is applied to these elements.

The arrangement structure 100F further comprises the wire harness 452 similarly to the third embodiment. The description of the third embodiment is applied to this wire harness 452.

The arrangement structure 100F further comprises the wire harness 462 similarly to the fourth embodiment. The description of the fourth embodiment is applied to this wire harness 462.

The arrangement structure 100F further comprises the wire harness 454E similarly to the sixth embodiment. The description of the sixth embodiment is applied to this wire harness 454E.

The arrangement structure 100F further comprises a wire harness 461F. The wire harness 461F extends forward (i.e., the first direction) from the main CPU 210 and inserted into the penetration hole THM. The wire harness 461F is bent leftward in front of the penetration hole THM. Inside the engine room, the wire harness 461F extends leftward (i.e., the second direction) along the dash panel DSQ and is bent forward at a position located near the left fender. The wire harness 451E extends forward along the left fender and is connected to the sub CPU 330.

Embodiment 8

Designers may make another signal transmission loop by combining the design doctrines described relating to the fifth embodiment and the seventh embodiment. In an eighth embodiment, an improved arrangement structure will be described.

Figure 8:
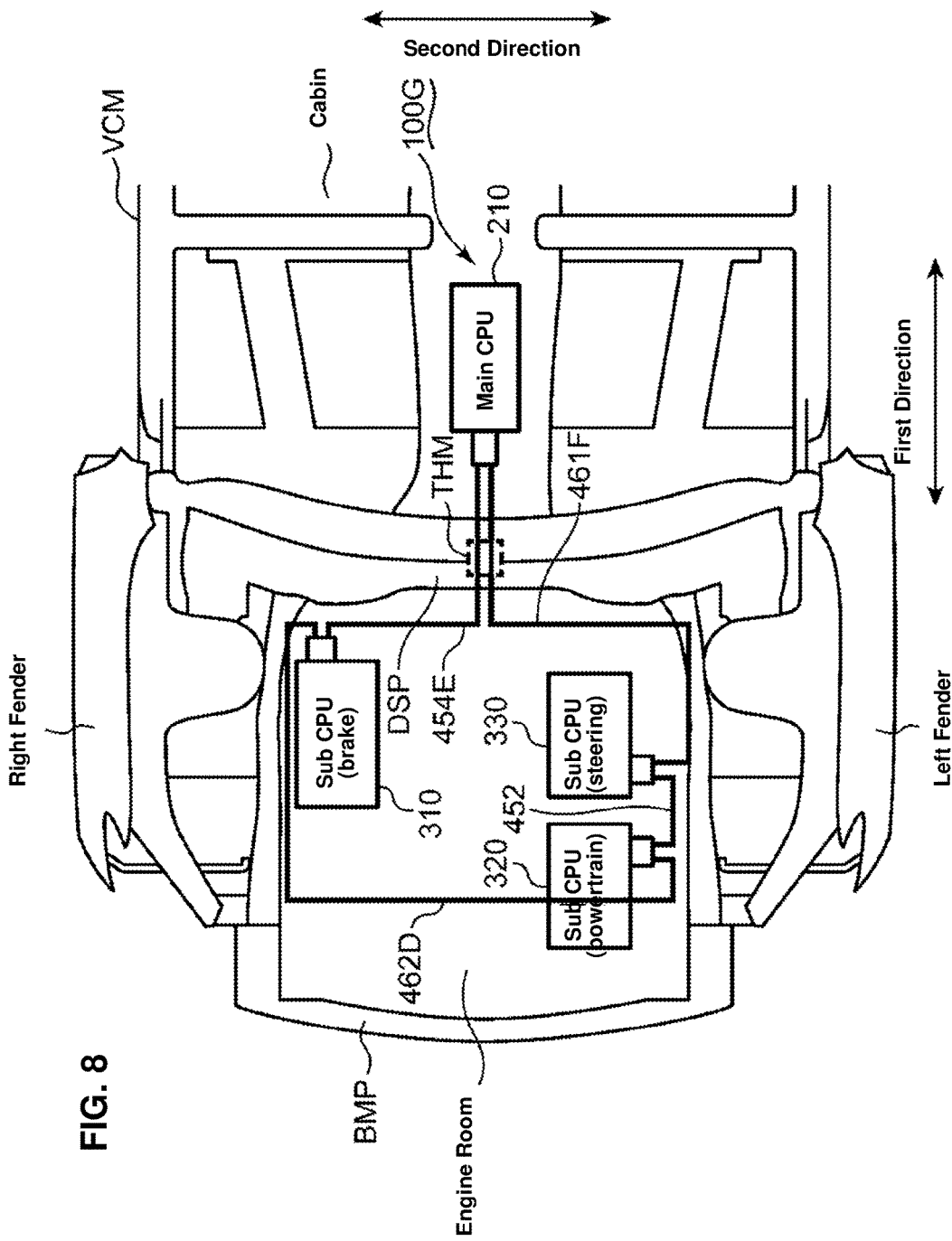
FIG. 8 is a conceptual block diagram of a wire harness arrangement structure of am eighth embodiment.

FIG. 8 is a conceptual block diagram of the wire harness arrangement structure (hereafter, referred to as an arrangement structure 100G) of the eighth embodiment. The arrangement structure 100G will be described referring to FIG. 8. The descriptions of the above-described embodiments are applied to elements of the eighth embodiment which are denoted by the same reference characters as the above-described embodiments.

The arrangement structure 100G is installed to the vehicle VCM similarly to the sixth embodiment. The description of the sixth embodiment is applied to the vehicle VCM.

The arrangement structure 100G comprises the main CPU 210 and the sub CPUs 310, 320, 330 similarly to the second embodiment. The description of the second embodiment is applied to these elements.

The arrangement structure 100G further comprises the wire harness 452 similarly to the third embodiment. The description of the third embodiment is applied to this wire harness 452

The arrangement structure 100G further comprises the wire harness 462D similarly to the fifth embodiment. The description of the third embodiment is applied to this wire harness 462D.

The arrangement structure 100G further comprises the wire harness 454E similarly to the sixth embodiment. The description of the sixth embodiment is applied to this wire harness 454E.

The arrangement structure 100G further comprises the wire harness 461F similarly to the seventh embodiment. The description of the seventh embodiment is applied to this wire harness 461F.

Embodiment 9

According to the design doctrine described relating to the sixth through eighth embodiments, the signal transmission loop extends leftward and rightward in the engine room. Alternatively, the signal transmission loop may extend leftward and rightward in the cabin. Since the cabin is harder than the engine room as described above, it is difficult that breakage of the signal transmission loop occurs. In a ninth embodiment, an improved arrangement structure will be described.

Figure 9:
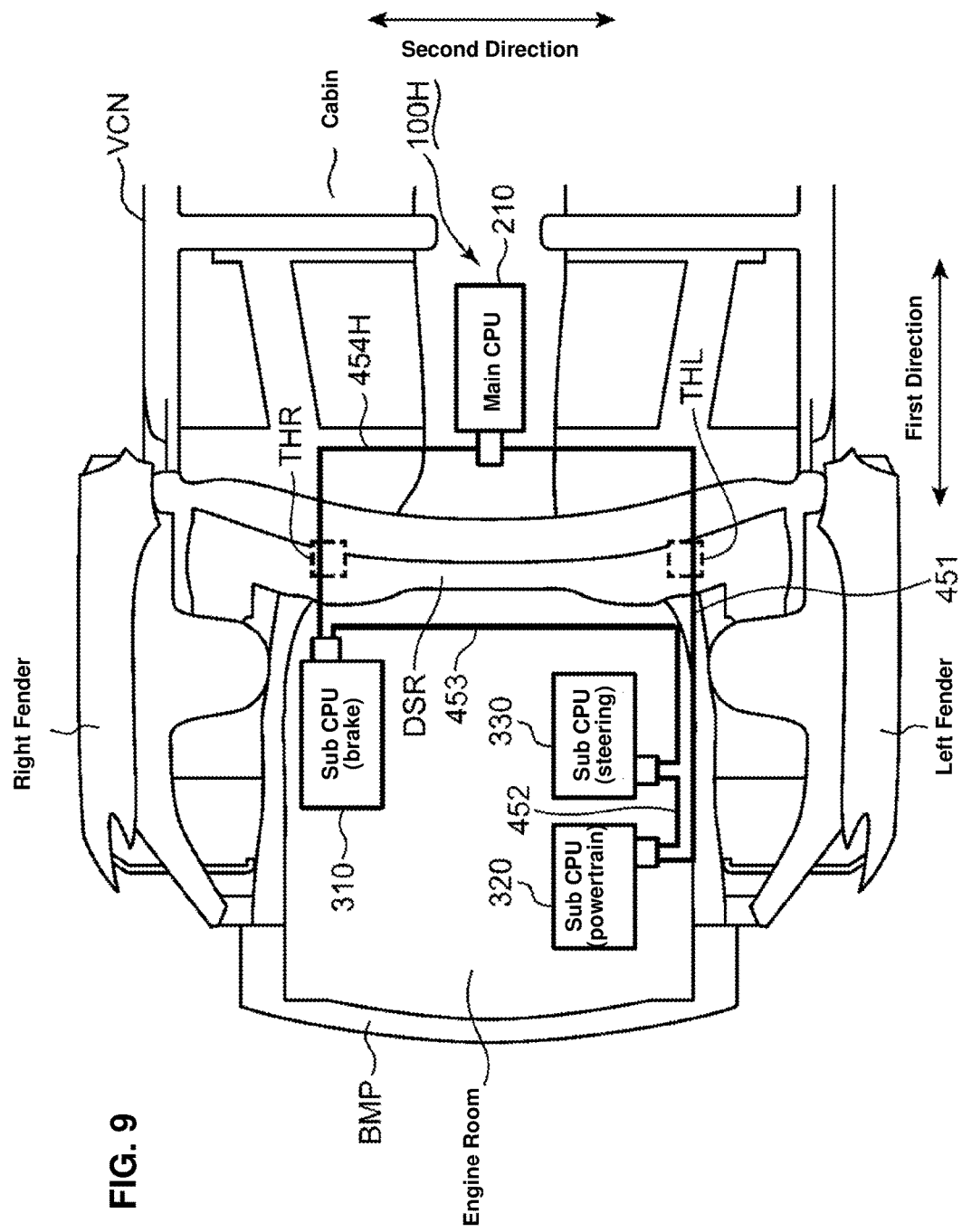
FIG. 9 is a conceptual block diagram of a wire harness arrangement structure of a ninth embodiment.

FIG. 9 is a conceptual block diagram of the wire harness arrangement structure (hereafter, referred to as an arrangement structure 100H) of the ninth embodiment. The arrangement structure 100H will be described referring to FIG. 9. The descriptions of the above-described embodiments are applied to elements of the ninth embodiment which are denoted by the same reference characters as the above-described embodiments.

FIG. 9 is a schematic plan view of a vehicle VCN. The vehicle VCN includes the bumper BMP similarly to the third embodiment. The description of the third embodiment is applied this bumper BMP.

The vehicle VCN includes a dash panel DSR. The dash panel DSR partitions a space inside the vehicle VCN into an engine room and a cabin. The engine room is formed between the dash panel DSR and the bumper BMP. The cabin is formed in back of the dash panel DSR.

The dash panel DSR has the penetration hole THL similarly to the third embodiment. The description of the third embodiment is applied to this penetration hole THL.

The dash panel DSR further has a penetration hole THR. The penetration hole THL is positioned near the left fender, and the penetration hole THR is positioned near the right fender. In the present embodiment, the first penetration hole is exemplified by the penetration hole THL. The second penetration hole is exemplified by the penetration hole THR.

The arrangement structure 100H comprises the main CPU 210 and the sub CPUs 310, 320, 330 similarly to the second embodiment. The description of the second embodiment is applied to these elements.

The arrangement structure 100H further comprises the wire harnesses 451, 452, 453 similarly to the third embodiment. The description of the third embodiment is applied to these wire harnesses 451, 452, 453. In the present embodiment, the first wire harness is exemplified by the wire harness 451.

The arrangement structure 100H further comprises a wire harness 454H. Inside the cabin, the wire harness 454H extends rightward (i.e., the second direction) from the main CPU 210 along the dash panel DSR and is bent forward (i.e., the first direction) in back of the penetration hole THR. The wire harness 454H is inserted into the penetration hole THR and connected to the sub CPU 310 inside the engine room.

The dash panel DSR extends between the wire harness 453 extending in the second direction inside the engine room and the wire harnesses 451, 454H extending in the second direction inside the cabin. Accordingly, it is difficult that the wire harnesses 451, 453, 454 get broken at the same time.

Embodiment 10

Designers may make another signal transmission loop by combining the design doctrines described relating to the fourth embodiment and the ninth embodiment. In a tenth embodiment, an improved arrangement structure will be described.

Figure 10:
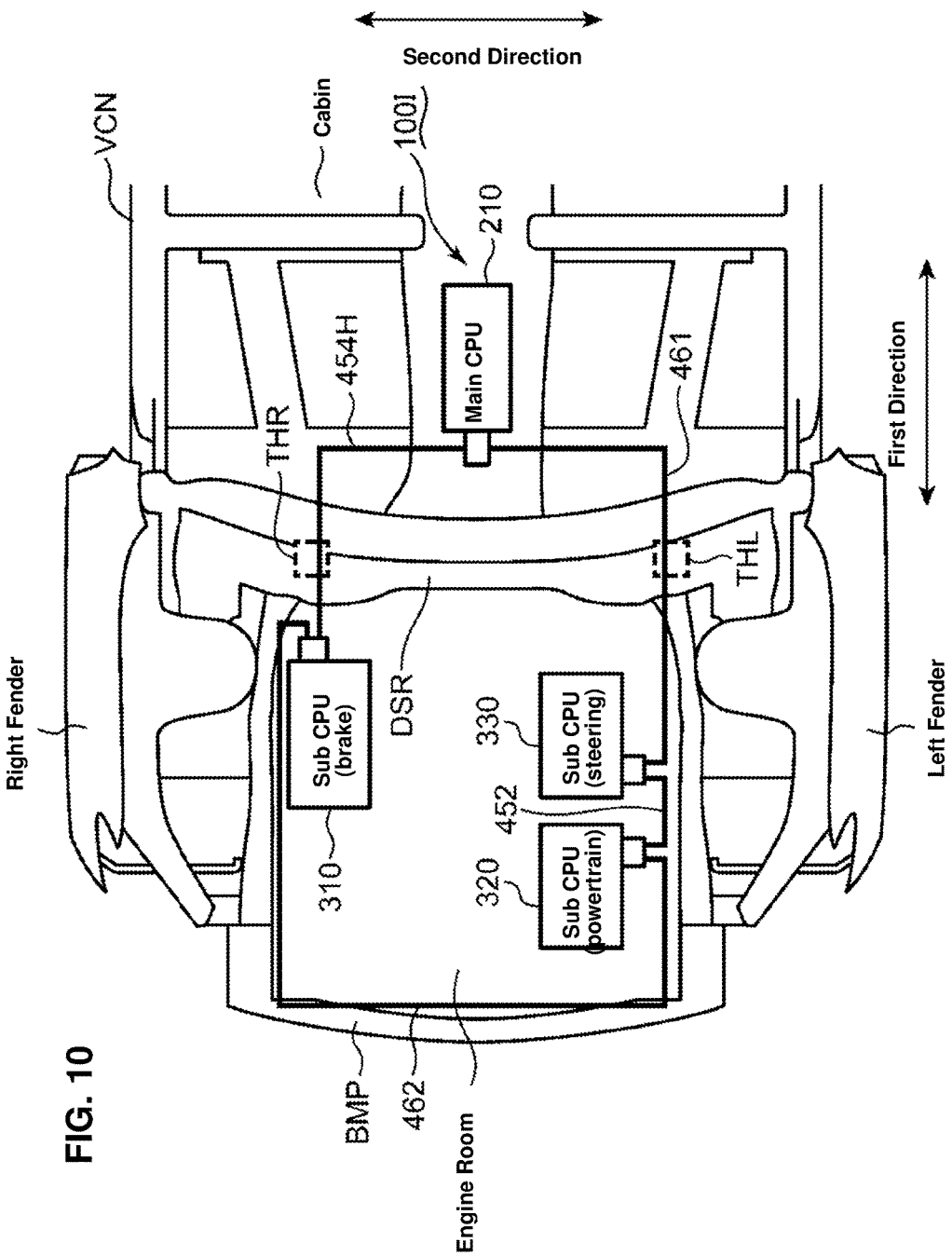
FIG. 10 is a conceptual block diagram of a wire harness arrangement structure of a tenth embodiment.

FIG. 10 is a conceptual block diagram of the wire harness arrangement structure (hereafter, referred to as an arrangement structure 100I) of the tenth embodiment. The arrangement structure 100I will be described referring to FIG. 10. The descriptions of the above-described embodiments are applied to elements of the tenth embodiment which are denoted by the same reference characters as the above-described embodiments.

The arrangement structure 100I is installed to the vehicle VCN similarly to the ninth embodiment. The description of the ninth embodiment is applied to the vehicle VCN.

The arrangement structure 100I comprises the main CPU 210 and the sub CPUs 310, 320, 330 similarly to the second embodiment. The description of the second embodiment is applied to these elements.

The arrangement structure 100I further comprises a wire harness 452 similarly to the third embodiment. The description of the third embodiment is applied to the wire harness 452.

The arrangement structure 100I further comprises wire the harnesses 461, 462 similarly to the fourth embodiment. The description of the fourth embodiment is applied to these wire harnesses 461, 462.

The arrangement structure 100I further comprises the wire harness 454H similarly to the ninth embodiment. The description of the ninth embodiment is applied to the wire harness 454H.

Embodiment 11

Designers may make another signal transmission loop by combining the design doctrines described relating to the fifth embodiment and the ninth embodiment. In an eleventh embodiment, an improved arrangement structure will be described.

Figure 11:
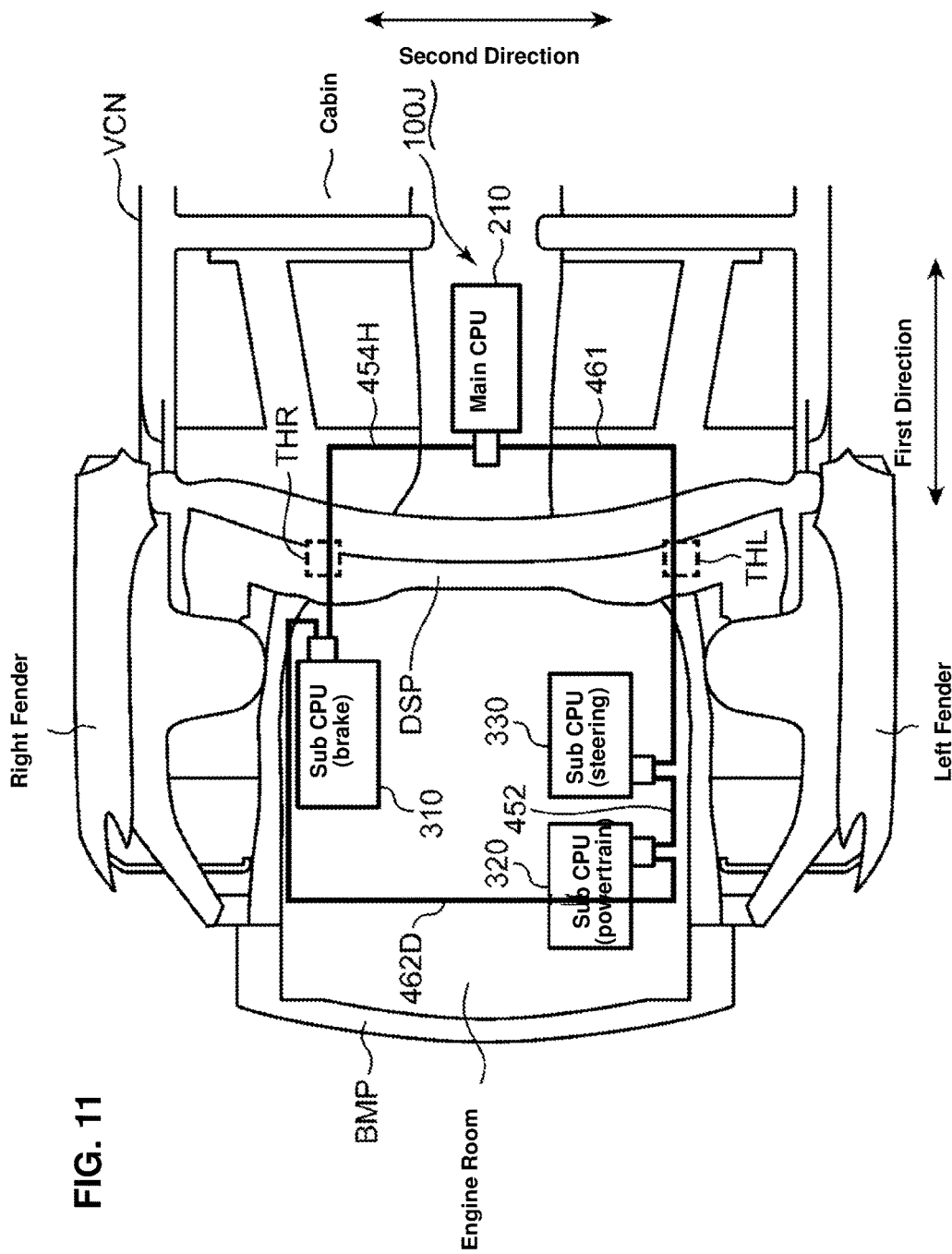
FIG. 11 is a conceptual block diagram of a wire harness arrangement structure of an eleventh embodiment.

FIG. 11 is a conceptual block diagram of the wire harness arrangement structure (hereafter, referred to as an arrangement structure 100J) of the eleventh embodiment. The arrangement structure 100J will be described referring to FIG. 11. The descriptions of the above-described embodiments are applied to elements of the eleventh embodiment which are denoted by the same reference characters as the above-described embodiments.

The arrangement structure 100J is installed to the vehicle VCN similarly to the ninth embodiment. The description of the ninth embodiment is applied to the vehicle VCN.

The arrangement structure 100J comprises the main CPU 210 and the sub CPUs 310, 320, 330 similarly to the second embodiment. The description of the second embodiment is applied to these elements.

The arrangement structure 100J further comprises the wire harness 452 similarly to the third embodiment. The description of the third embodiment is applied to this wire harness 452.

The arrangement structure 100J further comprises the wire harness 461 similarly to the fourth embodiment. The description of the fourth embodiment is applied to this wire harness 461.

The arrangement structure 100J further comprises the wire harness 462D similarly to the fifth embodiment. The description of the fifth embodiment is applied to this wire harness 462D.

The arrangement structure 100J further comprises the wire harness 454H similarly to the ninth embodiment. The description of the ninth embodiment is applied to this wire harness 454H.

Embodiment 12

The vehicle includes generally a reinforcing frame to improve the rigidity of the engine room. The reinforcing frame may be used for arrangement of the wire harness. In a twelfth embodiment, an exemplified layout of the wire harness in the engine room will be described.

Figure 12:
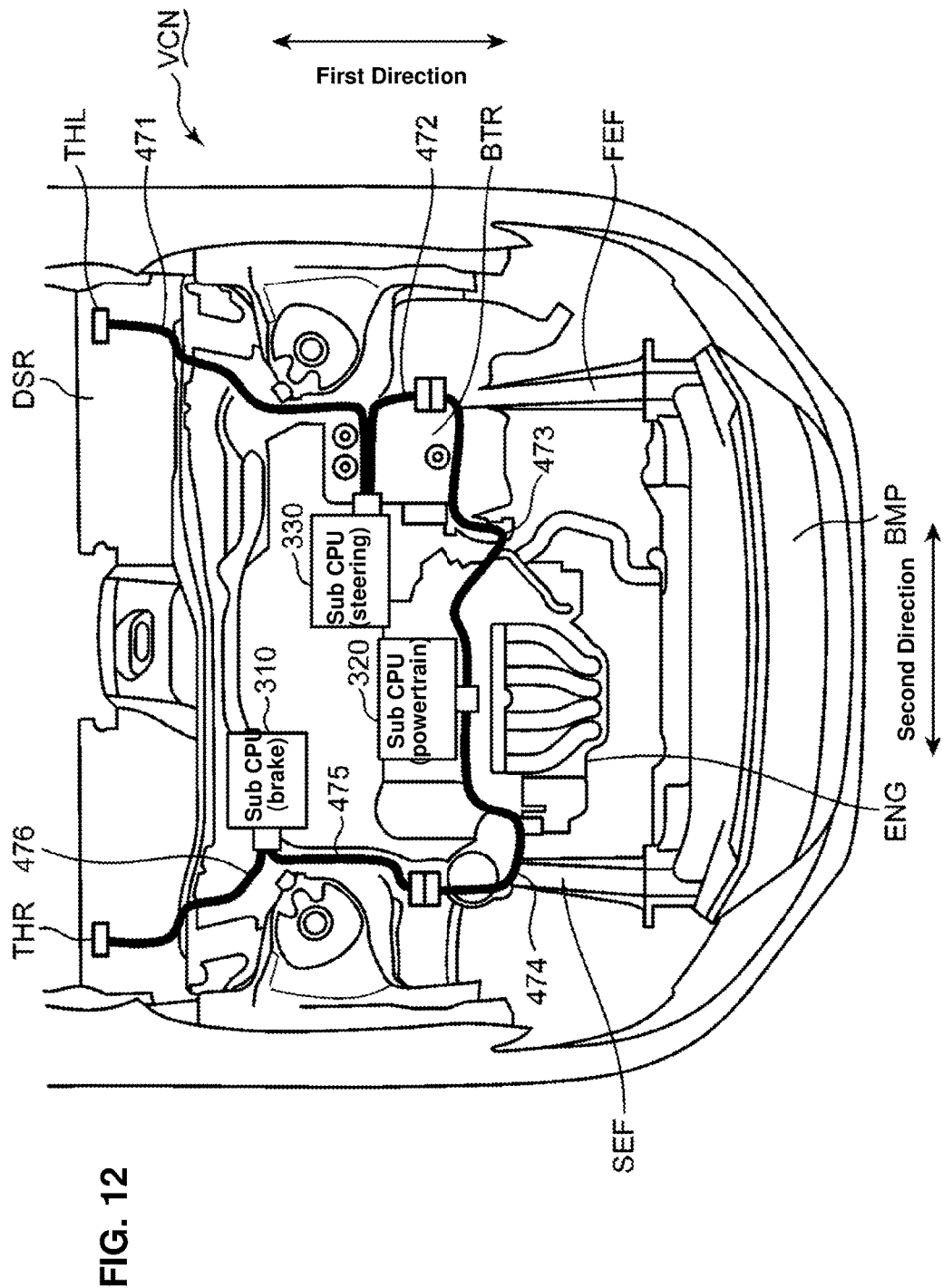
FIG. 12 is a schematic plan view of an engine room of a vehicle (a twelfth embodiment).

FIG. 12 is a schematic plan view of the engine room of the vehicle VCN. A structure of the engine room of the vehicle VCN will be described referring to FIGS. 11 and 12. The descriptions of the above-described embodiments are applied to elements of the twelfth embodiment which are denoted by the same reference characters as the above-described embodiments.

The vehicle VCN incudes the bumper BMP and the dash panel DSR as described relating to the ninth embodiment. The description of the ninth embodiment is applied to these elements.

The vehicle VCN includes two engine frames FEF, SEF. The engine frames FEF, SEF extend in the first direction between the bumper BMP and the dash panel DSR. The engine frame FEF is positioned on the left side of the engine frame SEF. In the present embodiment, a first engine frame is exemplified by the engine frame FEF. A second engine frame is exemplified by the engine frame SEF.

Various components, such as an engine ENG and a battery BTR, are arranged in a space between the engine frame FEF, SEF. The battery BTR is arranged between the engine ENG and the engine frame FEF. These components are protected by the engine frames FEF, SEF from an impact.

FIG. 12 shows the sub CPUs 310, 320, 330 described relating to the second embodiment. The description of the second embodiment is applied to the sub CPUs 310, 320, 330.

The sub CPUs 310, 320, 330 are arranged in the space between the engine frames FEF, SEF similarly to the engine ENG and the battery BTR. As shown in FIG. 12, the sub CPU 320 to control the power train is arranged on the engine ENG. The sub CPU 320 to control the steering (not illustrated) is arranged between the engine ENG and the battery BTR. A rack (not illustrated) of the steering may be provided to extend below the sub CPU 320. The sub CPU 310 is arranged in a corner of the engine room which is formed by the engine frame SEF and the dash panel DSR. A brake mechanism (not illustrated) may be arranged below the sub CPU 310.

FIG. 12 shows wire harnesses 471-476. The wire harness 471 extends inside the engine room from the left-side penetration hole THL formed at the dash panel DSR. The wire harness 471 is provided to extend along the engine frame FEF and the battery BTR and connected to the sub CPU 330. The wire harness 471 corresponds to the wire harness 461 described referring to FIG. 11.

The wire harness 472 is provided to extend from the sub CPU 330 along the battery BTR and the engine frame FEF and is connected to the wire harness 473 via a connector. The wire harness 473 extends rightward (i.e., the second direction) along the battery BTR and the engine ENG and is connected to the sub CPU 320. The wire harnesses 472, 473 correspond to the wire harness 452 described referring to FIG. 11. In the present embodiment, the first route is exemplified by the wire harnesses 471, 472.

The wire harness 474 extends rightward from the sub CPU 320 and is connected to the wire harness 475 via a connector on the engine frame SEF. The wire harness 475 extends along the engine frame SEF and is connected to the sub CPU 310. The wire harnesses 474, 475 correspond to the wire harness 462D described referring to FIG. 11.

The wire harness 476 extends from the sub CPU 310 along the engine frame SEF and is inserted into the cabin positioned in back of the dash panel DSR, passing through the right-side penetration hole THR formed at the dash panel DSR. The wire harness 476 corresponds to the wire harness 454H described referring to FIG. 11. In the present embodiment, the second route is exemplified by the wire harnesses 475, 476.

Embodiment 13

A reinforcing frame (a cross car beam, for example) which extends in the vehicle width direction (i.e., the second direction) is arranged in back of the dash panel in many cases. The wire harness extending from the main CPU may be attached to the vehicle by using the reinforcing frame. In a thirteenth embodiment, an arrangement of the wire harness using the reinforcing frame will be described.

Figure 13A:
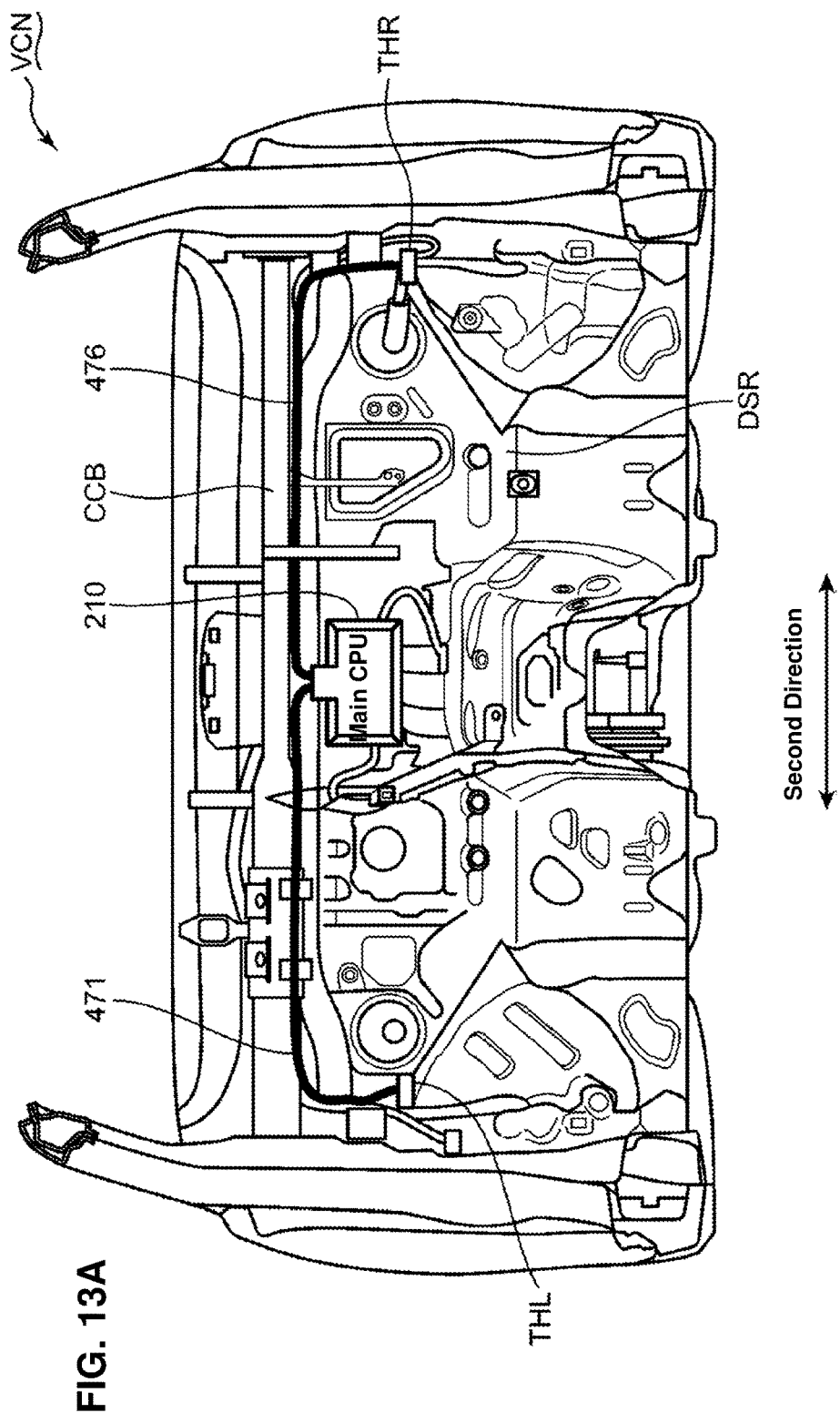
FIG. 13A is a schematic back view of a dash panel of the vehicle shown in FIG. 12 (a thirteenth embodiment).
Figure 13B:
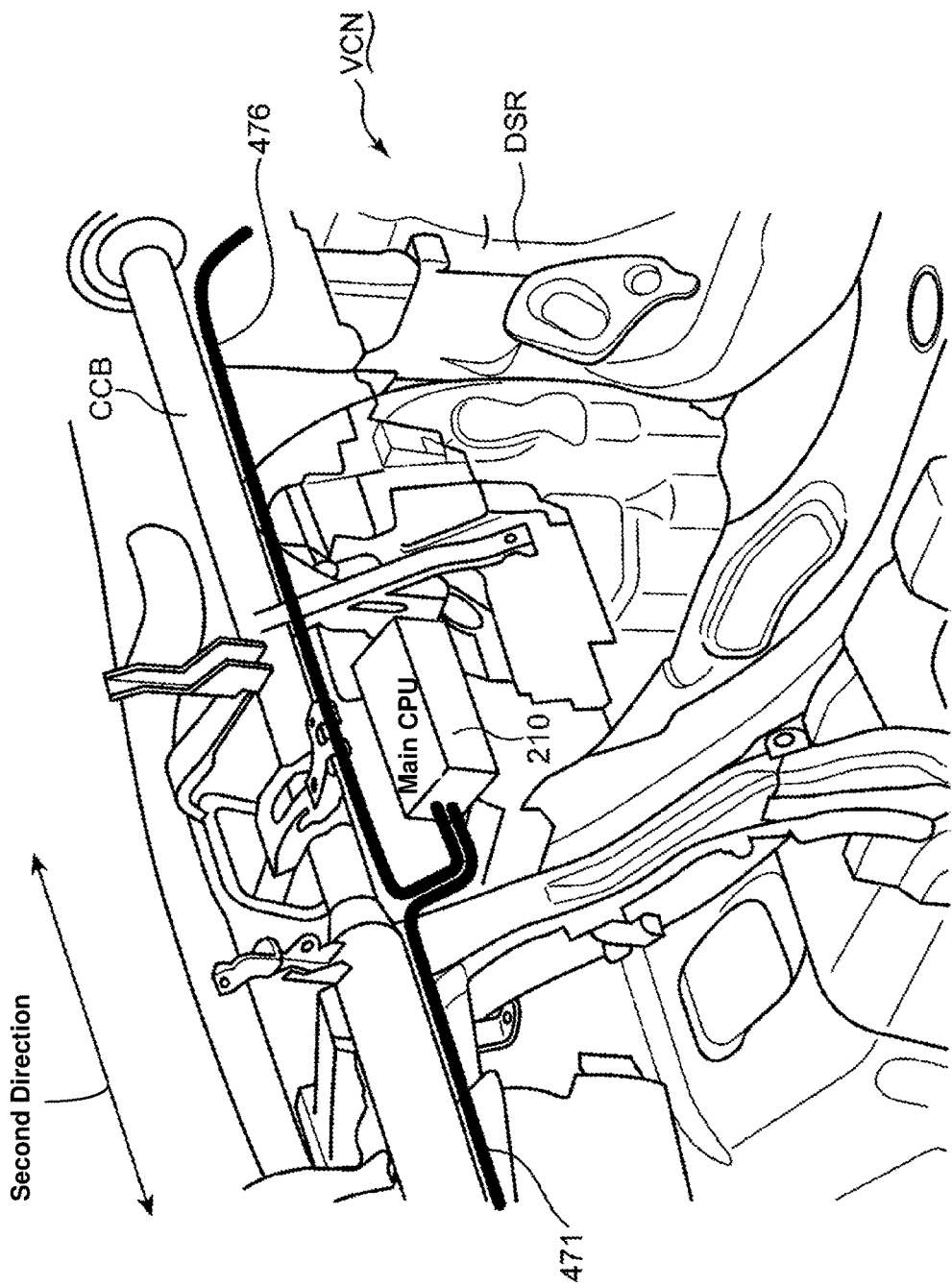
FIG. 13B is a schematic perspective view of the dash panel shown in FIG. 13A.

FIG. 13A is a schematic back view of the dash panel DSR of the vehicle VCN. FIG. 13B is a schematic perspective view of the dash panel DSR. A structure of a cabin of the vehicle VCN will be described referring to FIGS. 12 and 13B. The descriptions of the above-described embodiments are applied to elements of the thirteenth embodiment which are denoted by the same reference characters as the above-described embodiments.

The vehicle VCN comprises a cross car beam CCB. The cross car beam CCB extends in the second direction at a position located in back of the dash panel DSR. The cross car beam CCB increases the rigidity of the second direction of the vehicle VCN. In the present embodiment, the reinforcing frame is exemplified by the cross car beam CCB.

The wire harnesses 471, 476 described referring to FIG. 12 are inserted into the cabin positioned in back of the dash panel DSR through the penetration holes THL, THR. The wire harnesses 471, 476 are provided to extend rightward and leftward along the cross car beam CCB and connected to the main CPU 210. The wire harnesses 471, 476 may be fixed to the cross car beam CCB. In the present embodiment, the first wire harness is exemplified by the wire harness 471. The second wire harness is exemplified by the wire harness 476.

Figure 14:
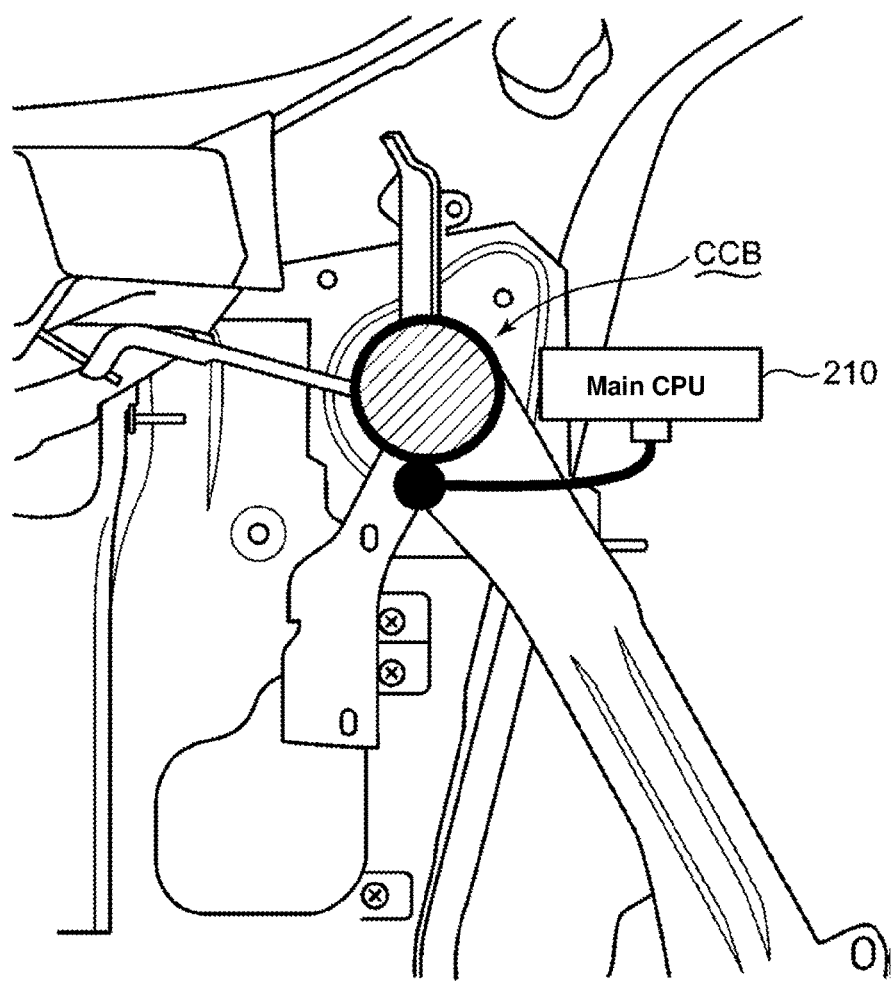
FIG. 14 is a schematic sectional view of a cross car beam of the vehicle shown in FIGS. 12 and 13B.

FIG. 14 is a schematic sectional view of the cross car beam CCB. A positional relationship between the main CPU 210 and the cross car beam CCB will be described referring to FIG. 14.

The main CPU 210 is arranged near the cross car beam CCB. Preferably, the main CPU 210 is arranged in back of the cross car beam CCB. Consequently, the main CPU 210 is protected by the cross car beam CCB from an impact generated from the side or an impact generated from the front side.

The doctrines of the above-described various embodiments may be combined so as to meet demands for the vehicle. Part of various features described relating to one of the above-described various embodiments may be applied to the arrangement structure described relating to the other one of the above-described various embodiments.

The doctrines of the above-described embodiments are preferably usable in designing of various vehicles.

What is claimed is:

1. A wire harness arrangement structure of a vehicle, comprising:
   plural vehicle-drive component control parts to control a brake, an engine, a transmission, and a steering for governing a drive of the vehicle, which are provided between a front end of the vehicle and a dash panel of the vehicle;
   a vehicle-non-drive component control part to control any other electric component than the brake, the engine, the transmission, or the steering, which is provided between the front end of the vehicle and the dash panel of the vehicle;
   a main control part to generate a command signal for providing a command to each of the plural vehicle-drive component control parts and the vehicle-non-drive component control part, which is provided in back of the dash panel;
   plural wire harnesses for vehicle-drive component control parts to transmit the command signal to the vehicle-drive component control parts; and
   a wire harness for vehicle-non-drive component control part to transmit the command signal to the vehicle-non-drive component control part,
   wherein said plural wire harnesses for vehicle-drive component control parts constitute a signal transmission loop which extends from said main control part and returns to the main control part by way of said plural vehicle-drive component control parts, whereby transmission of the command signal from the main control part to the vehicle-drive component control parts is configured to be a two-way type,
   said wire harness for vehicle-non-drive component control part constitutes a single signal-transmission path which extends from the main control part to the vehicle-non-drive component control part, whereby transmission of the command signal from the main control part to the vehicle-non-drive component control part is configured to be a one-way type, and
   said plural wire harnesses for vehicle-drive component control parts constituting the signal transmission loop comprises a first portion which extends from the dash panel forwardly toward the front end of the vehicle at a position which is located on a side of one of right-and-left fenders of the vehicle, a second portion which extends from said first portion toward the other fender of the vehicle, and a third portion which extends from said second portion rearwardly toward the dash panel of the vehicle at a position which is located on a side of the other fender of the vehicle,
   whereby in a case where said first portion of the loop-shaped wire harnesses is broken, the command signal from said main control part to said vehicle-drive component control parts is transmitted through said third portion of the wire harnesses, whereas in a case where said third portion of the loop-shaped wire harnesses is broken, the command signal from said main control part to said vehicle-drive component control parts is transmitted through said first portion of the wire harnesses.

2. The wire harness arrangement structure of the vehicle of claim 1, wherein said signal transmission loop includes a first route which extends in a first direction which is directed toward the front end of the vehicle from the dash panel and a second route which is spaced apart from said first route in a second direction perpendicular to said first direction and extends in the first direction, and at least part of said plural vehicle-drive component control parts is provided between said first route and said second route.

3. The wire harness arrangement structure of the vehicle of claim 2, wherein said vehicle includes a first engine frame which extends between the front end of the vehicle and the dash panel and a second engine frame which extends between the front end of the vehicle and the dash panel at a position which is spaced apart from said first engine frame in said second direction, said first route is formed along the first engine frame, and said second route is formed along said second engine frame.

4. The wire harness arrangement structure of the vehicle of claim 2, wherein a first penetration hole and a second penetration hole are formed at the dash panel, said second penetration hole is provided at a position which is offset, in said second direction, from said first penetration hole, and said wire harnesses for vehicle-drive component control parts include a first wire harness which extends from said main control part toward the first penetration hole and a second wire harness which extends from the main control part toward the second penetration hole.

5. The wire harness arrangement structure of the vehicle of claim 4, wherein the vehicle includes a reinforcing frame which extends in said second direction in back of the dash panel, and said first wire harness and said second wire harness are provided to extend along said reinforcing frame.

* * * * *